(12) United States Patent
Ying et al.

(10) Patent No.: US 12,328,602 B2
(45) Date of Patent: Jun. 10, 2025

(54) ML MODEL MANAGEMENT IN O-RAN

(71) Applicant: Intel Corporation, Santa Clara, CA (US)

(72) Inventors: Dawei Ying, Hillsboro, OR (US); Jaemin Han, Portland, OR (US); Leifeng RUan, Beijing (CN); Qian Li, Beaverton, OR (US); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/484,074

(22) Filed: Sep. 24, 2021

(65) Prior Publication Data

US 2022/0014942 A1    Jan. 13, 2022

(51) Int. Cl.
| | |
|---|---|
| *H04W 24/02* | (2009.01) |
| *G06N 5/022* | (2023.01) |
| *H04L 67/02* | (2022.01) |
| *H04W 16/14* | (2009.01) |

(52) U.S. Cl.
CPC .......... *H04W 24/02* (2013.01); *G06N 5/022* (2013.01); *H04L 67/02* (2013.01); *H04W 16/14* (2013.01)

(58) Field of Classification Search
CPC ...... H04W 24/02; H04W 16/14; G06N 5/022; H04L 67/02
USPC ........................................................ 370/252
See application file for complete search history.

(56) References Cited

U.S. PATENT DOCUMENTS

| | | | | |
|---|---|---|---|---|
| 2021/0337420 | A1* | 10/2021 | Lo .......................... | G06F 9/5083 |
| 2022/0116799 | A1* | 4/2022 | Wang .................... | H04W 24/10 |
| 2024/0046148 | A1* | 2/2024 | Bega ..................... | H04L 41/16 |

OTHER PUBLICATIONS

O-RAN Working Group 2, Non-RT RIC: Functional Architecture v1.01, O-RAN specifications by O-RAN Alliance, Jun. 2021 (Year: 2021).*
O-RAN Working Group 2, AL/ML workflow description and requirements v. 1.02, O-RAN specifications by O-RAN Alliance, Feb. 2021 (Year: 2021).*

* cited by examiner

*Primary Examiner* — Nicholas R Taylor
*Assistant Examiner* — Chong G Kim
(74) *Attorney, Agent, or Firm* — Schwegman Lundberg & Woessner, P.A.

(57) ABSTRACT

Apparatuses for non real-time (Non-RT) radio access network intelligence controller (RIC) and Near-RT RIC services for machine learning (ML) model management in an open radio access network (O-RAN) are disclosed. The services include ML model monitoring, getting and putting ML models from and to an AI-ML producer and an AI-ML consumer, and terminating the use of an ML mode. The ML model monitoring includes the AI-ML consumer sending monitoring data to the AI-ML producer and the AI-ML producer processing the monitoring data and taking actions based on the monitoring data. The services may be performed over the AI interface using HTTP.

17 Claims, 17 Drawing Sheets

ML MODEL MANAGEMENT IN O-RAN

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G networks such as 5G NR unlicensed spectrum (NR-U) networks and other unlicensed networks including Wi-Fi, CBRS (OnGo), and so forth. Other aspects are directed to Open RAN (O-RAN) architectures and, more specifically, techniques for providing artificial intelligence (AI) and machine learning (ML) model monitoring, management, and storage between non-real-time (Non-RT) radio access network (RAN) intelligent controllers (RICs) (Non-RT RICs) and Near-RT RICs.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modem society has continued to drive demand for a wide variety of networked devices in many disparate environments. Fifth-generation (5G) wireless systems are forthcoming and are expected to enable even greater speed, connectivity, and usability. Next generation 5G networks are expected to increase throughput, coverage, and robustness and reduce latency and operational and capital expenditures. 5G new radio (5G-NR) networks will continue to evolve based on 3GPP LTE-Advanced with additional potential new radio access technologies (Rat's) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE and NR systems in the licensed, as well as unlicensed spectrum, is expected in future releases and 5G systems such as O-RAN systems. Such enhanced operations can include techniques for AI and ML for O-RAN networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

A technical problem is how to use ML models in an O-RAN architecture. Embodiments addressed this technical problem by providing monitoring services in a Non-RT RIC of a ML model being used in a Near-RT RIC. The ML model's performance is monitored by the Non-RT RIC by collecting model monitoring feedback (e.g., model response time, model accuracy, and so forth) from the Near-RT RIC and anomalies or model drifting are addressed by providing monitoring results or instructions to the Near-RT RIC, which may replace or update the ML model with a previous ML model stored at the Non-RT RIC that is known to perform within acceptable thresholds or parameters. The Non-RT RIC and the Near-RT RIC communicate over the A1 interface.

Figure 1:
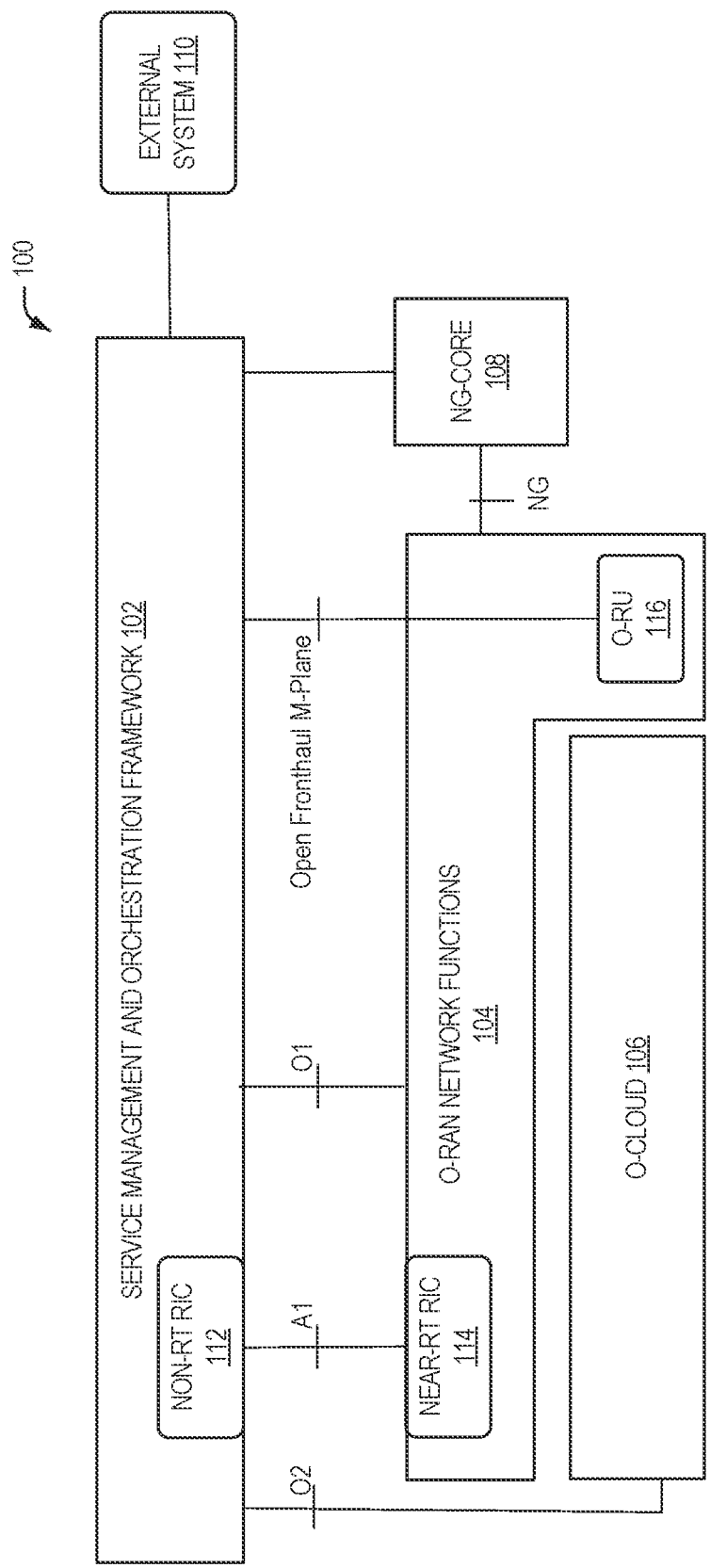
FIG. 1 illustrates an example Open RAN (O-RAN) system architecture.

FIG. 1 provides a high-level view of an Open RAN (O-RAN) architecture 100. The O-RAN architecture 100 includes four O-RAN defined interfaces—namely, the A1 interface, the O1 interface, the O2 interface, and the Open Fronthaul Management (M)-plane interface—which connect the Service Management and Orchestration (SMO) framework 102 to O-RAN network functions (NFs) 104 and the O-Cloud 106. The SMO 102 (described in Reference [R13]) also connects with an external system 110, which provides enrichment data to the SMO 102. FIG. 1 also illustrates that the A1 interface terminates at an O-RAN Non-Real Time (RT) RAN Intelligent Controller (RIC) 112 in or at the SMO 102 and at the O-RAN Near-RT RIC 114 in or at the O-RAN NFs 104. The O-RAN NFs 104 can be virtual network functions (VNFs) such as virtual machines (VMs) or containers, sitting above the O-Cloud 106 and/or Physical Network Functions (PNFs) utilizing customized hardware. All O-RAN NFs 104 are expected to support the O1 interface when interfacing with the SMO framework 102. The O-RAN NFs 104 connect to the NG-Core 108 via the NG interface (which is a 3GPP defined interface). The Open Fronthaul M-plane interface between the SMO 102 and the O-RAN Radio Unit (O-RU) 116 supports the O-RU 116 management in the O-RAN hybrid model as specified in Reference [R16]. The Open Fronthaul M-plane interface is an optional interface to the SMO 102 that is included for backward compatibility purposes as per Reference [R16] and is intended for management of the O-RU 116 in hybrid mode only. The management architecture of flat mode (see Reference [R12]) and its relation to the O1 interface for the O-RU 116 is in development. The O-RU 116 termination of the O1 interface towards the SMO 102 as specified in Reference [R12].

Figure 2:
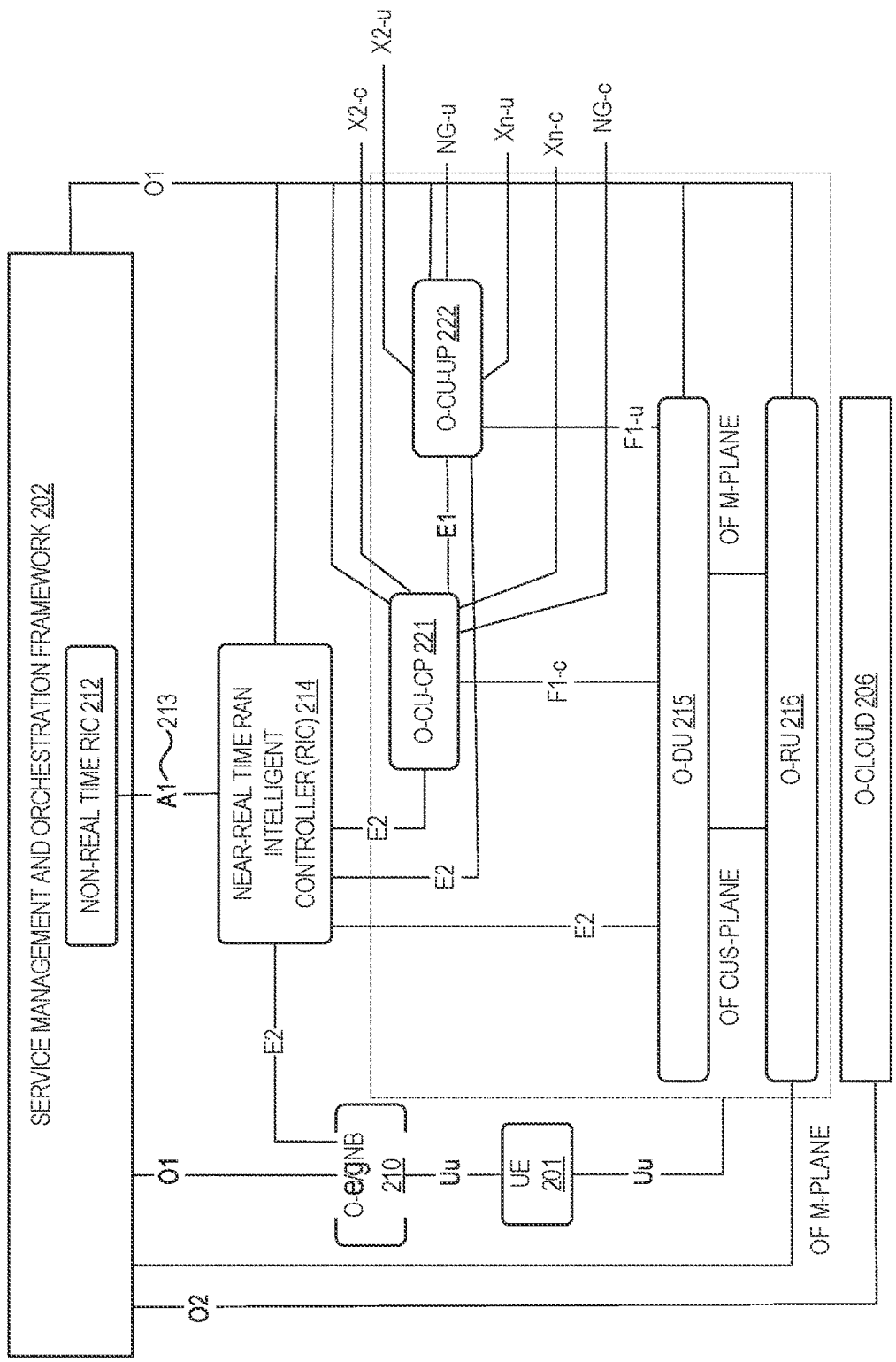
FIG. 2 shows an O-RAN logical architecture 200 corresponding to the O-RAN architecture 100 of FIG. 1.

FIG. 2 shows an O-RAN logical architecture 200 corresponding to the O-RAN architecture 100 of FIG. 1. In FIG. 2, the SMO 202 corresponds to the SMO 102, O-Cloud 206 corresponds to the O-Cloud 106, the non-RT RIC 212 corresponds to the non-RT RIC 112, the near-RT RIC 214 corresponds to the near-RT RIC 114, and the O-RU 216 corresponds to the O-RU 116 of FIG. 2, respectively. The O-RAN logical architecture 200 includes a radio portion and a management portion.

The management portion/side of the architectures 200 includes the SMO Framework 202 containing the non-RT RIC 212, and may include the O-Cloud 206. The O-Cloud 206 is a cloud computing platform including a collection of physical infrastructure nodes to host the relevant O-RAN functions (e.g., the near-RT RIC 214, O-RAN Central Unit-Control Plane (O-CU-CP) 221, O-RAN Central Unit-User Plane O-CU-UP 222, and the O-RAN Distributed Unit (O-DU) 215, supporting software components (e.g., OSs, VMMs, container runtime engines, ML engines, etc.), and appropriate management and orchestration functions.

The radio portion/side of the logical architecture 200 includes the near-RT RIC 214, the O-DU 215, the O-RAN Radio Unit (O-RU) 216, the O-CU-CP 221, and the O-CU-UP 222 functions. The radio portion/side of the logical architecture 200 may also include the O-e/gNB 210.

The O-DU 215 is a logical node hosting Radio Link Control (RLC), media access control (MAC), and higher physical (PRY) layer entities/elements (High-PHY layers) based on a lower layer functional split. The O-RU 216 is a logical node hosting lower PI-JY layer entities/elements (Low-PHY layer) (e.g., FFT/iFFT, PRACH extraction, etc.) and RF processing elements based on a lower layer functional split. Virtualization of O-RU 216 is FFS. The O-CU-CP 221 is a logical node hosting the RRC and the control plane (CP) part of the PDCP protocol. The O-CU-UP 222 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 221, O-CU-UP 222, O-DU 215, or any combination of elements as defined in Reference [R15]. For E-UTRA access the E2 nodes include the O-e/gNB 210. As shown in FIG. 2, the E2 interface also connects the O-e/gNB 210 to the Near-RT RIC 214. The protocols over E2 interface are based exclusively on Control Plane (CP) protocols. The E2 functions are grouped into the following categories: (a) near-RT RIC 214 services (REPORT, INSERT, CONTROL and POLICY, as described in Reference [R15]); and (b) near-RT RIC 214 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 2 further illustrates the Uu interface between a UE 201 and O-e/gNB 210 as well as between the UE 201 and O-RAN components. The Uu interface is a 3GPP defined interface (see e.g., sections 5.2 and 5.3 of Reference [R07]), which includes a complete protocol stack from L1 to L3 and terminates in the NG-RAN or E-UTRAN. The O-e/gNB 210 is an LTE eNB (see Reference [R04]), a 5G gNB or ng-eNB (see Reference [R06]) that supports the E2 interface. The O-e/gNB 210 may be the same or similar as discussed in FIGS. 3-17. The UE 201 may correspond to UEs discussed with respect to FIGS. 3-17 and/or the like. There may be multiple UEs 201 and/or multiple O-e/gNB 210, each of which may be connected to one another the via, respective Uu interfaces. Although not shown in FIG. 2, the O-e/gNB 210 supports O-DU 215 and O-RU 216 functions with an Open Fronthaul interface between them.

The Open Fronthaul (OF) interface(s) is/are between O-DU 215 and O-RU 216 functions (see References [R16] and [R17].) The OF interface(s) includes the Control User Synchronization (CUS) Plane and Management (M) Plane. FIGS. 1 and 2 also show that the O-RU 216 terminates the OF M-Plane interface towards the O-DU 215 and optionally towards the SMO 202 as specified in Reference [R16]. The O-RU 216 terminates the OF CUS-Plane interface towards the O-DU 215 and the SMO 202.

The F1-c interface connects the O-CU-CP 221 with the O-DU 215. As defined by 3GPP, the F1-c interface is between the gNB-CU-CP and gNB-DU nodes (see References [R07] and [R10].) However, for purposes of O-RAN, the F1-c interface is adopted between the O-CU-CP 221 with the O-DU 215 functions while reusing the principles and protocol stack defined by 3GPP and the definition of interoperability profile specifications.

The F1-u interface connects the O-CU-UP 222 with the O-DU 215. As defined by 3GPP, the F1-u interface is between the gNB-CU-UP and gNB-DU nodes (see References [R07] and [R10]). However, for purposes of O-RAN, the F1-u interface is adopted between the O-CU-UP 222 with the O-DU 215 functions while reusing the principles and protocol stack defined by 3GPP and the definition of interoperability profile specifications.

The NG-c interface is defined by 3GPP as an interface between the gNB-CU-CP and the AMF in the 5GC (see Reference [R06]). The NG-c is also referred as the N2 interface (see Reference [R06]). The NG-u interface is defined by 3GPP, as an interface between the gNB-CU-UP and the UPF in the 5GC (see Reference [R06]). The NG-u interface is referred as the N3 interface (see Reference [R06]). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., [O05], [O06]). In O-RAN, X2-c and X2-u protocol stacks defined by 3GPP are reused and may be adapted for O-RAN purposes.

The Xn-c interface is defined in 3GPP for transmitting control plane information between gNBs, ng-eN3s, or between an ng-eNB and gNB. The Xn-u interface is defined in 3GPP for transmitting user plane information between gNBs, ng-eNBs, or between ng-eNB and gNB (see e.g., References [R06] and [R08]). In O-RAN, Xn-c and Xn-u protocol stacks defined by 3GPP are reused and may be adapted for O-RAN purposes.

The E1 interface is defined by 3GPP as being an interface between the gNB-CU-CP (e.g., gNB-CU-CP 3728) and gNB-CU-UP (see e.g., [O07], [O09]). In O-RAN, E1 protocol stacks defined by 3GPP are reused and adapted as being an interface between the O-CU-CP 221 and the O-CU-UP 222 functions.

The O-RAN Non-Real Time (RT) RAN Intelligent Controller (RIC) 212 is a logical function within the SMO framework 102, 202 that enables non-real-time control and optimization of RAN elements and resources; AI/machine: teaming (ML) workflow(s) including model training, inferences, and updates; and policy-based guidance of applications/features in the Near-RT MC 214.

The O-RAN near-RT RIC 214 is a logical function that enables near-real-time control and optimization of RAN elements and resources via fine-grained data collection and actions over the E2 interface. The near-RT RIC 214 may include one or more AI/ML workflows including model training, inferences, and updates.

The non-RT MC 212 can be an ML training host to host the training of one or more ML models. The ML data can collected from one or more of the following: the Near-RT RIC 214, O-CU-CP 221, O-CU-UP 222, O-DU 215, O-RU 216, external enrichment source 110 of FIG. 1, and so forth. For supervised learning, and the ML training host and/or ML inference host/actor can be part of the non-RT RIC 212 and/or the near-RT RIC 214. For unsupervised learning, the ML training host and ML inference host/actor can be part of the non-RT RIC 212 and/or the near-RT RIC 214. For reinforcement learning, the ML training host and ML inference host/actor are co-located as part of the near-RT RIC 214. In some implementations, the non-RT RIC 212 may request or trigger ML model training in the training hosts regardless of where the model is deployed and executed. ML models may be trained and not currently deployed.

In some implementations, the non-RT RIC 212 provides a query-able catalog for an ML designer/developer to publish/install trained ML models (e.g., executable software components). In these implementations, the non-RT RIC 212 may provide discovery mechanism if a particular ML model can be executed in a target ML inference host (MF), and what number and type of ML models can be executed in the target ML inference host. The Near-RT RIC 214 is a managed function (MF). For example, there may be three types of ML catalogs made discoverable by the non-RT RIC 212: a design-time catalog (e.g., residing outside the non-RT RIC 212 and hosted by some other ML platform(s)), a training/deployment-time catalog (e.g., residing inside the non-RT RIC 212), and a run-time catalog (e.g., residing inside the non-RT RIC 212). The non-RT RIC 212 supports necessary capabilities for ML model inference in support of ML assisted solutions running in the non-RT RIC 212 or some other ML inference host. These capabilities enable executable software to be installed such as VMs, containers, etc. The non-RT RIC 212 may also include and/or operate one or more ML engines, which are packaged software executable libraries that provide methods, routines, data types, etc., used to run ML models. The non-RT RIC 212 may also implement policies to switch and activate ML model instances under different operating conditions.

The non-RT RIC 22 is able to access feedback data (e.g., FM, PM, and network KPI statistics) over the O1 interface on ML model performance and perform necessary evaluations. If the ML model fails during runtime, an alarm can be generated as feedback to the non-RT RIC 212. How well the ML model is performing in terms of prediction accuracy or other operating statistics it produces can also be sent to the non-RT RIC 212 over O1. The non-RT RIC 212 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 214 and/or in the non-RT RIC 212, which continuously monitors resource utilization. If resources are low or fall below a certain threshold, the runtime environment in the near-RT RIC 214 and/or the non-RT RIC 212 provides a scaling mechanism to add more ML instances. The scaling mechanism may include a scaling factor such as an number, percentage, and/or other like data used to scale up/down the timber of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 212, which is within—the SMO 202) and the near-RT RIC 214. The A1 interface supports three types of services as defined in Reference [R14], including a Policy Management Service, an Enrichment Information Service, and ML Model Management Service. A1 policies have the following characteristics compared to persistent configuration as defined in Reference [R14]: A1 policies are not critical to traffic; A1 policies have temporary validity; A1 policies may handle individual UE or dynamically defined groups of UEs; A1 policies act within and take precedence over the configuration; and A1 policies are non-persistent, i.e., do not survive a restart of the near-RT RIC.

The Non-RT RIC 212 is the functionality internal to SMO 202 and one Non-RT RIC 212 can connect to multiple Near-RT RICs 214. Between the Non-RT RIC 212 and the Near-RT RICs is the A1 interface 213. The A1 interface enables the Non-RT RIC 212 to provide policy-based guidance, ML model management, and enrichment information to Near-RT RICs 214 for RAN optimization and operation, e.g. RRM. The A1 services include A1 policy management: service (A1-P), A1 ML model management: service (A1-ML), and A1 enrichment information (A1-EI). See References [R02] and [R03] for A1-P specifications and a description of A1-EI. The A1-ML service is developed herein to enable ML model management within the O-RAN components.

Figure 3:
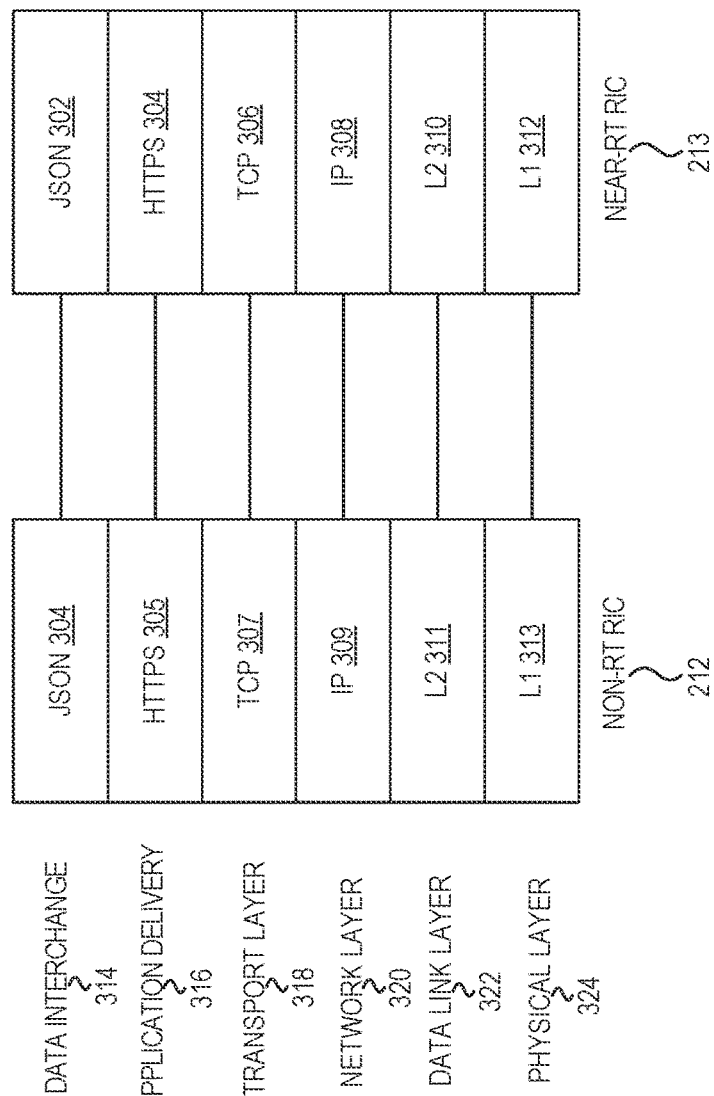
FIG. 3 illustrates services of the A1 interface, in accordance with some embodiments.

FIG. 3 illustrates services of the A1 interface 300, in accordance with some embodiments. The services of the A1 interface 300 include A1 policy service (A1-P) 316, A1AI/ML model management service (A1-ML) 318, and A1 enrichment information (EI) service (A1-EI) 320. One Non-RT RIC 212 can connect to multiple Near-RT RICs 214. The reference [R03] describes A1-P 316, A1-ML 318, and EI 320, between the Non-RT RIC 212 and the Near-RT RIC 214 for RAN optimization and operation. The Non-RT RIC 212 includes A1-P consumer 304, A1-ML consumer 306, A1-EI producer 306 A1-P producer 310, A1-ML producer 312, and A1-EI consumer 314.

Figure 4:
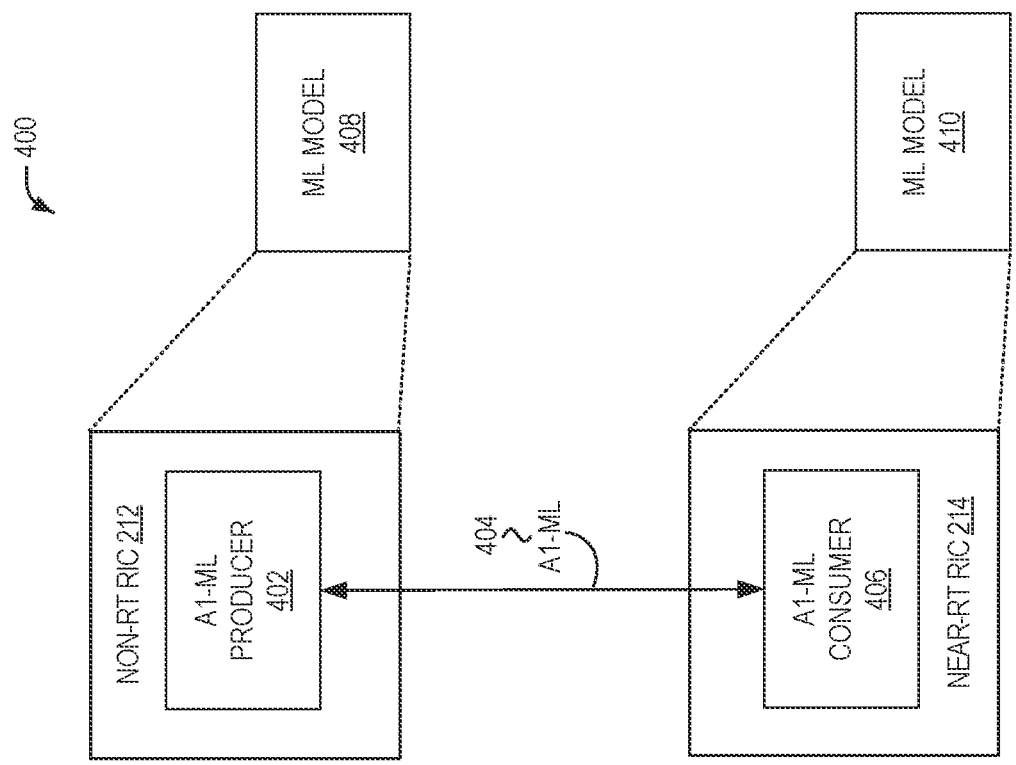
FIG. 4 illustrates a model management service (A1-ML), in accordance with some embodiments.
Figure 5:
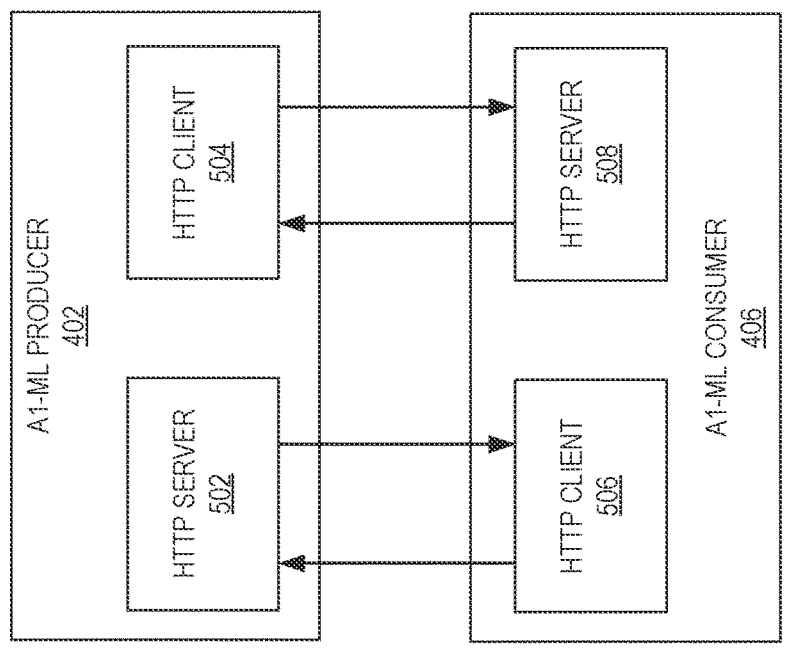
FIG. 5 illustrates a system for using hypertext transfer protocol (HTTP) to implement the A1-ML services, in accordance with some embodiments.

FIG. 4 illustrates a model management service (A1-ML) 400, in accordance with some embodiments. To support ML models deployed in xApps, which may reside in the Near-RT RIC 214, Non-RT RIC 212 provides ML model management services over the A1 interface 213 for the Near-RT RIC 214 and xApps. The A1-ML 404 services include the following: registering an ML model for management; providing feedback regarding ML model performance indicators, e.g., model accuracy, response time, and so forth; sending ML model periodic heartbeat requests; receiving ML model management instructions, e.g., model update, model termination, and so forth; and, deregistering ML models. The A1-ML producer 402 resides in the Non-RT RIC 212 and provides services to the A1-ML consumer 406, which resides in the Near-RT RIC 214. The A1-ML 404 services use signaling between A1-ML producer 402 in Non-RT RIC 212 and the A1-ML consumer 406 in Near-RT RIC 214. Near-RT RIC 214, as service consumer, requests model management service from the Non-RT RIC 212, and it subscribes to notifications for ML model management. In one embodiment, A1-ML consumer 406 and A1-Mt: producer 402 both use HTTP operations as illustrated in FIG. 5. The Non-RT RIC 212 includes one or more Mt models 408, which may be pretrained or being trained. The Near-RT RIC 214 includes one or more ML models 410, which may be used for inference or another purpose. The Near-RT RIC 214 may include an ML inference module that uses the ML model 410 for performing functions of the Near-RT RIC 214. The Near-RT RIC 214 may include xApps that may use the ML model 410 for performing functions of the Near-RT RIC 214. Some example control functions for Near-RT RIC RAN include: radio resource management, radio access control, mobility control, and so forth.

FIG. 5 illustrates a system 500 for using hypertext transfer protocol (HTTP) to implement the A1-ML services, in accordance with some embodiments. The A1-ML producer 402 includes HTTP server 502 and HTTP client 504, which communicate with HTTP client 506 and HTTP server 508, respectively, of the A1-ML consumer 406. The communication is over the A1 interface 213. All of the communications such as is disclosed in the figures and accompany text may be performed using HTTP.

Figure 6:
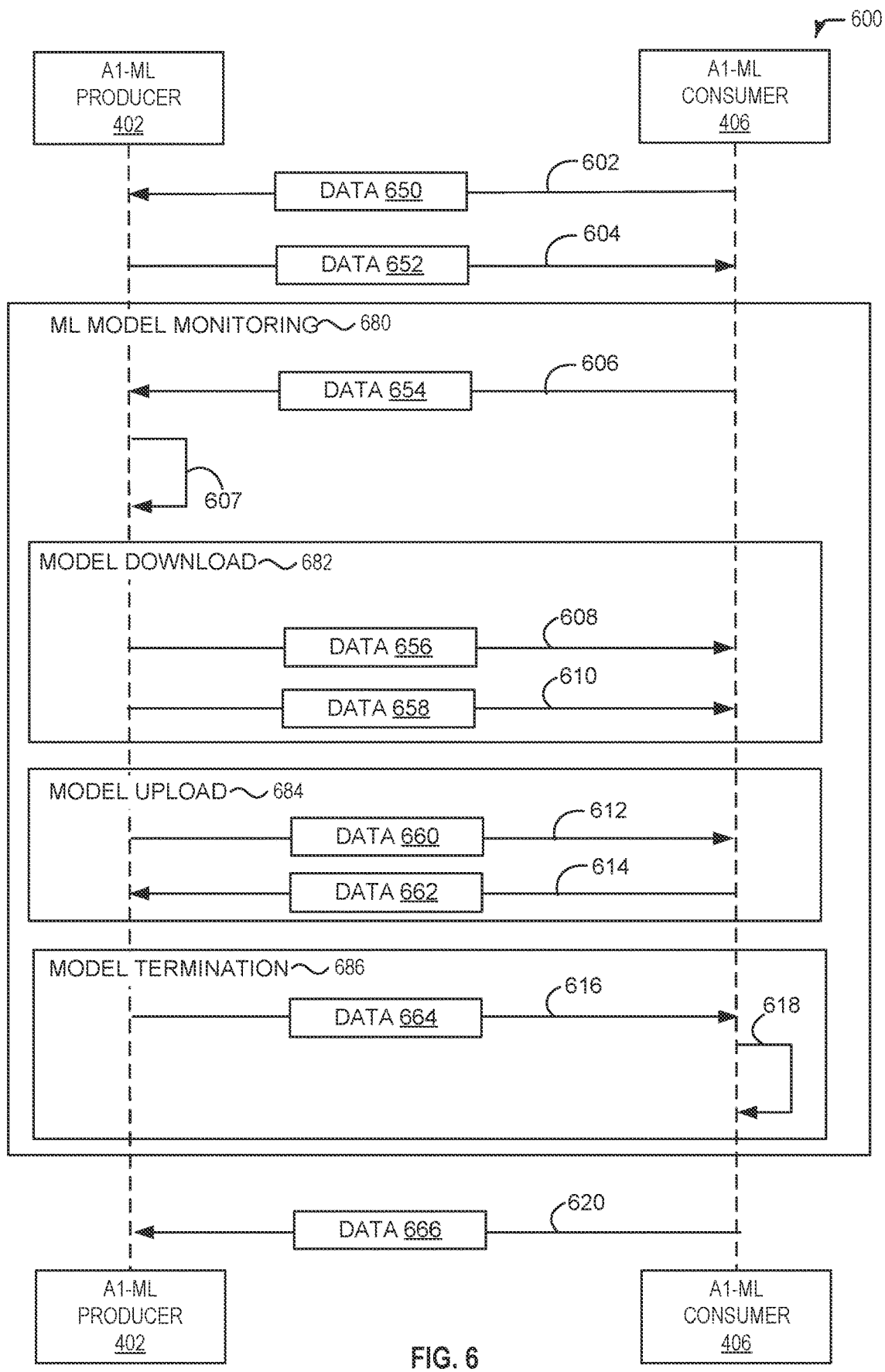
FIG. 6 illustrates a method for ML model management, in accordance with some embodiments.

FIG. 6 illustrates a method 600 for ML model management, in accordance with some embodiments. The communication is over the A1 interface 213. The method 600 begins at operation 602 with registering ML model for model management services. The data 650 is the registering message along with any accompanying data. The Near-RT RIC 214 registers an ML model 410 which needs management service. With successful registration, Non-RT RIC 212 would set the heart-beat periodicity, model performance reporting thresholds, reporting duration, and so forth. The Near-RT RIC follows the instruction and provides reporting to Non-RT RIC. The Near-RT RIC 214 subscribes to management event notifications from Non-RT RIC 212, which includes ML model 410 termination notification, model update notification, and model upload notification. The Near-RT RIC 214 should terminate (model terminate 686), download a new model (download model 682), or upload the current model (model upload 684) following the instruction of Non-RT RIC 212. Near-RT RIC would deregister a ML model 208 from Non-RT RIC 212, for example, when the model gets deactivated.

The method 600 continues at operation 604 with configuring ML model monitoring. The data 652 includes the message for configuring and any other accompanying data. The Non-RT RIC 212 may send configuration parameters to the Near-RT RIC 214 which indicates, for example, the data to be sent in operation 606 and how often to perform operation 606.

The method 600 continues at operation 606 with sending a periodic monitoring report (heartbeat) to the Non-RT RIC 212. The data 654 includes the periodic monitor report, which may be termed feedback/monitoring data, and any accompany data. The periodic monitoring may be determined based on a configuration of the ML, model 410 monitoring sent from the Non-RT RIC 212 or negotiated with the Non-RT RIC 212, e.g., in operation 604.

The method 600 continues at operation 607 with analysis based on ML model 410 monitoring data. The Non-RT RIC 212 performs an analysis of the performance of the ML model 410 based on the data from operation 606 and, optionally, previous feedback/monitoring data. The ML model monitoring 680, which includes operations 606 and 607, may be repeated until a termination event occurs. In operation 607, the A1-ML producer 402 may determine to perform a model download 682, a model upload 684, a model termination 686, or to continue on.

The method 600 includes a model download 682, which includes operations 608 and 610. The portion of the method 600 for the model download 682 begins at operation 608 with ML model download notification. The data 656 includes the ML model download notification and any accompanying data. The method 600 continues at operation 610 with the ML model download. The data 658 includes the ML model 408 and any other data. The ML model may be used as ML model 410 and is thus used for inferences or other purposes.

The method 600 includes model upload 684, which includes operations 612 and 614. The portion of the method 600 for model upload 684 begins at operation 612 with ML model upload notification. The data 660 includes the message of the ML model upload notification and any accompany data. The Non-RT RIC 212 is notifying the Near-RT RIC 214 to upload the ML model 410. The method 600 continues at operation 614 with model upload. The data 662 includes the ML model 410 and any accompanying data. The uploaded ML model 410 may be trained or stored as ML model 408, or it may be discarded.

The method 600 continues with model termination 686, which includes operations 616 and 618. The method 600 continues at operation 616 with ML model termination notification. The data 664 includes the message of the ML model termination notification and any accompany data. The method 600 continues at operation 618 with terminate ML model. For example, the Near-RT RIC 214 terminates using ML model 410.

The method 600 includes operation 620 with a request by the Near-RT RIC 214 to deregister the ML model with the Non-RT RIC 212. The data 666 includes the message to deregister ML model and any accompanying data. The Non RT RIC 212 responds by deregistering the ML model 408 that was registered for model management (and use in the RAN) by the Near-RT RIC 214.

Figure 7:
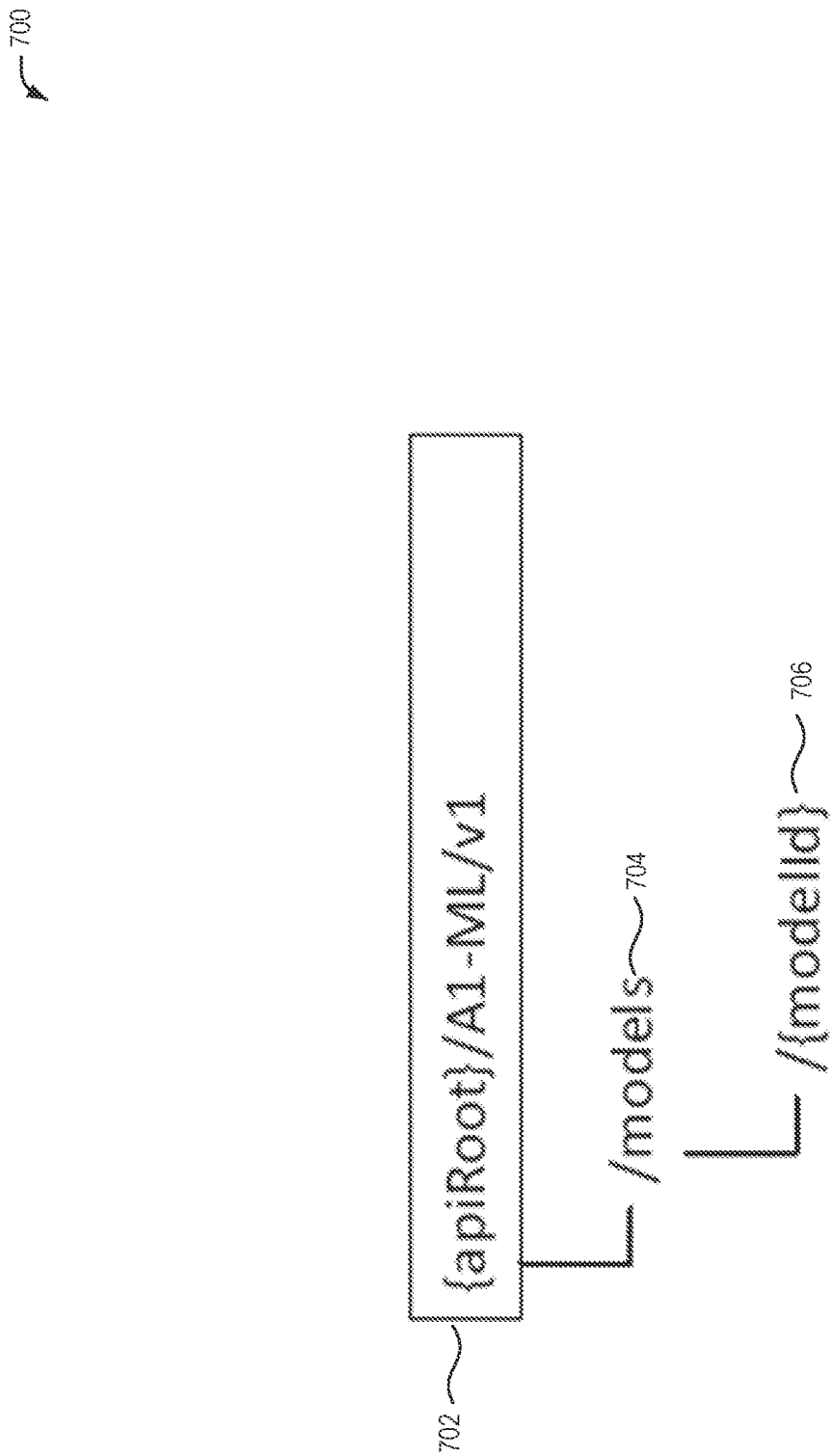
FIG. 7 illustrates a uniform resource identifier (URI), in accordance with some embodiments.

FIG. 7 illustrates a uniform resource identifier (URI) 700, in accordance with some embodiments. The URI 700 structure includes root 702 of {apiRoot}/A1-ML/v1. A directory below the root 702 includes "/models" 704 with a directory for "/{modelId}" 706. Other structures may be used.

Near-RT RIC 214 identifies a ML model 410 by a model instance ID. The ID is assigned by Non-RT RIC 212 when the ML model is deployed over the O1 interface to the Near-RT RIC 214. xApps are invisible to the 213 A1 interface; therefore, the ML model management relies on ML model instance IDs and not xApp IDs. The Near-RT RIC 212 correlates a ML model instance ID to the corresponding xApp. Table 1 provides resource and methods for HTTP methods.

TABLE 1

Resources and Methods

| Resource Name | Resource URI | HTTP Method | Description |
|---|---|---|---|
| All model instances | /model | GET | Retrieve all model identifiers |
| Individual model instance | /model/{model} | GET | Retrieve a model instance |
| | | PUT | Register a model, or modify a model instance, or provide heartbeat |
| | | DELETE | Deregister a model |
| Notification | {notificationDestination} | POST | Notify model management instructions |

A model instance contains the model's identity, periodicity of model monitoring report, supported type(s) of monitoring feedback, and, optionally, information for model file transfer. Table 2 provides an example of a definition of a type of model instance.

TABLE 2

Definition of Type Model Instance (ModelInstance)

| Attribute Name | Data Type | P | Cardinality | Description |
|---|---|---|---|---|
| modelId | String | M | 1 | Unique identify of a ML model instance. It must be presented in both request and response messages. |
| hearBeatTimer | Number | C | 0 . . . 1 | Time in seconds. It sets the periodicity of heartbeat message from Near-RT RIC. The timer can be proposed by the consumer in the register request, or it can be set by Non-RT RIC in the registration response. |
| monitoringType | Monitoring Type | M | 0 . . . 1 | Configuration for ML model monitoring. Near-RT RIC uses it to declare supported feedback type(s) in the registration/update request. Non-RT RIC uses it to select supported monitoring type in message body of responses. |

TABLE 2-continued

Definition of Type Model Instance (ModelInstance)

| Attribute Name | Data Type | P | Cardinality | Description |
|---|---|---|---|---|
| modelAccuracy | Number | O | 0 . . . 1 | Report of model accuracy. It can be included in update request message if A1-ML consumer supports this type of feedback and producer also configures it for monitoring. |
| modelLoss | Number | O | 0 . . . 1 | Report of modelLoss funciton value. It can be included in update request message if A1-ML consumer supports the type of feedback and producer also configures it for monitoring. |
| modelProcessingDelay | Number | O | 0 . . . 1 | Report of model processing delay. It can be included in update request message if A1-ML consumer supports this type of feedback and producer also configures it for monitoring. |
| modelResource Utilization | Number | O | 0 . . . 1 | Report of model computation and memory resource utilization. It can be included in update request message if A1-ML consumer supports this type of feedback and producer also configures it for monitoring. |
| rnodelFileInfo | Model FileInfo | O | 0 . . . 1 | Information for ML model upload, including model type, file location, file size, file format, and file compression method, etc. w |

The monitoring type contains four possible feedback types for ML model monitoring. The list can be extended further for more feedback types. If an indicator is "false" in the request message, e.g., operation 602, from the Near-RT RIC 214, then Non-RT RIC 212 should not set the indicator to "true" in response. If an indicator is "true" in the request message from the Near-RT RIC 214, then the Non-RT RIC 212 may set the indicator to "false" in response. The Non-RT RIC 212 may select which feedback types to set to "true" or it may, if supported, set to "true" all the feedback types that the Near-RT RIC 214 set to "true". For different model instances, the Near-RT MC 214 may report different report capabilities. Table 3 provides an example of a definition of a type of monitoring The data collected by the A1-ML consumer 406 from using the ML model instance to perform functions may be termed monitoring data.

TABLE 3

Definition of Type Monitoring Type (MonitoringType)

| Attribute Name | Data Type | P | Cardinality | Description |
|---|---|---|---|---|
| modelAccuracyInd | boolean | M | 1 | In request message from Near-RT RIC, it indicates whether model accuracy is supported for feedback. In response message from Non-RT RIC, it indicates whether model accuracy is configured for model monitoring |
| modelLossInd | Boolean | M | 1 | In request message from Near-RT RIC, it indicates whether model loss function value is supported for feedback. In response message from Non-RT RIC, it indicates whether model loss function vlaue is configured for model monitoring. |
| modelProcessing Delayind | Boolean | M | 1 | In request message from Near-RT RIC, it indicates whether model processing delay is supported for feedback. In response message from Non-RT RIC, it indicates whether model processing delay is configured for model monitoring |
| modelResource UtilizationInd | Boolean | M | 1 | In request message from Near-RT RIC, it indicates whether model resource utilization is supported for feedback. In response message from Non-RT RIC, it indicates whether model resource utilization is configured for model monitoring. |

ModelFileInfo may, optionally, be included in the model instance update message. To upload the model file to the Non-RT RIC 212, the Near-RT RIC 214 provides necessary information for file transfer, i.e., file location, file size, file format, and file compression method, and so forth. Near-RT RIC 214 may indicate whether the uploaded file is a gradient-based update or a compressed. model, so that Non-RT RIC 212 can properly update its local ML model 410 copy. Table 4 provides an example of a definition of type model file information (info).

TABLE 4

Definition of Type ModelFileInfo

| Attribute Name | Data Type | P | Cardinality | Description |
|---|---|---|---|---|
| modelFileType | ModelFile Type | M | 1 | Type of file for model update, including gradient and compressed model. |
| modelFile Location | String | M | 1 | Model update file location |
| modelFile Size | Number | M | 1 | Model update file size. |
| ModelFileFormat | String | M | 1 | Model update file encoding method. |
| modelFile Compression | String | M | 1 | Model update file compression algortihm. |

Table 5 provides an example of an enumeration of the model file type. The update may be a gradient or a compressed model.

TABLE 5

Enumeration ModelFileType

| Enumeration Value | Description |
|---|---|
| Gradient | The model file contains the gradient for model update. |
| Compressed_model | The model file contains a compressed model for model update. |

Based on feedback from the Near-RT RIC 214, the Non-RT RIC 212 may send notifications to start a ML model download to address detected ML model drifting. The Non-RT RIC 212 may instruct the A1-ML consumer 406 to upload the ML model, or it can ask the A1-ML consumer 406 to terminate the ML model immediately if a large impact on the network performance is detected. For the ML model download notification, the NotificanonData. includes necessary information for ML model file transfer. For the ML model termination notification, the Non-RT RIC 212 may, optionally, provide a reason for the termination. Table 6 provides an example of a definition of a type of notification data.

TABLE 6

Definition of Type Notification Data (NotificationData)

| Attribute Name | Data Type | P | Cardinality | Description |
|---|---|---|---|---|
| modelID | String | M | 1 | Unique identify of a ML model instance |
| Notification Type | Notification Type | M | 1 | Type of notification, including "MODEL_DOWNLOAD", "MODEL_UPLOAD", "MODEL_TERMINATION". "MODEL_QUERY". |
| modelFile Info | ModelFile Info | O | 0 . . . 1 | Information for ML model download, including model type, file location, file size, file format, and file compression method, etc. |
| termination Reason | Termination Reason | O | 0 . . . 1 | Reason for ML model termination, including, "LOW_ACCURACY", "LARGE_DELAY", "INSUFFICIENT_RESOURCE", "UNDEFINED_INPUT", "RAN_DEGRADATION", "OTHER_REASON" |

Table 7 provides an example of an enumeration notification type, in accordance with some embodiments.

TABLE 7

Enumeration Notification Type

| Enumeration Value | Description |
|---|---|
| Model_Download | Notificaiton for a ML model download from Non-RT RIC to Near-RT RIC |
| Model Upload | Notification to request a ML model upload from Near-RT RIC to Non-RT RIC |

TABLE 7-continued

Enumeration Notification Type

| Enumeration Value | Description |
| --- | --- |
| Model Termination | Notification to terminate a ML Model in Near-RT RIC |
| Model Query | Notification to query ML model instance, e.g., due to missing heartbeat |

Table 8 provides an example of an enumeration termination reason, in accordance with some embodiments.

TABLE 8

Enumeration Termination Reason

| Enumeration Name | Description |
| --- | --- |
| Low_Accuracy | The accuracy of ML model is too low, and it cannot be easily addressed via model update. |
| Large Delay | ML Model's processing delay is too large. |
| Insufficient Resource | ML Model's resource utilization is too high, not enough resource to support model inference. |
| Undefined Input | Missing input data, e.g., due to the termination of an upstream model. Missing enrichment data, e.g., due to A1-E1 unsubscription. |
| RAN Degradation | Large RAN performance degradation is detected. |
| Other Reason | Other Reasons. |

Figure 8:
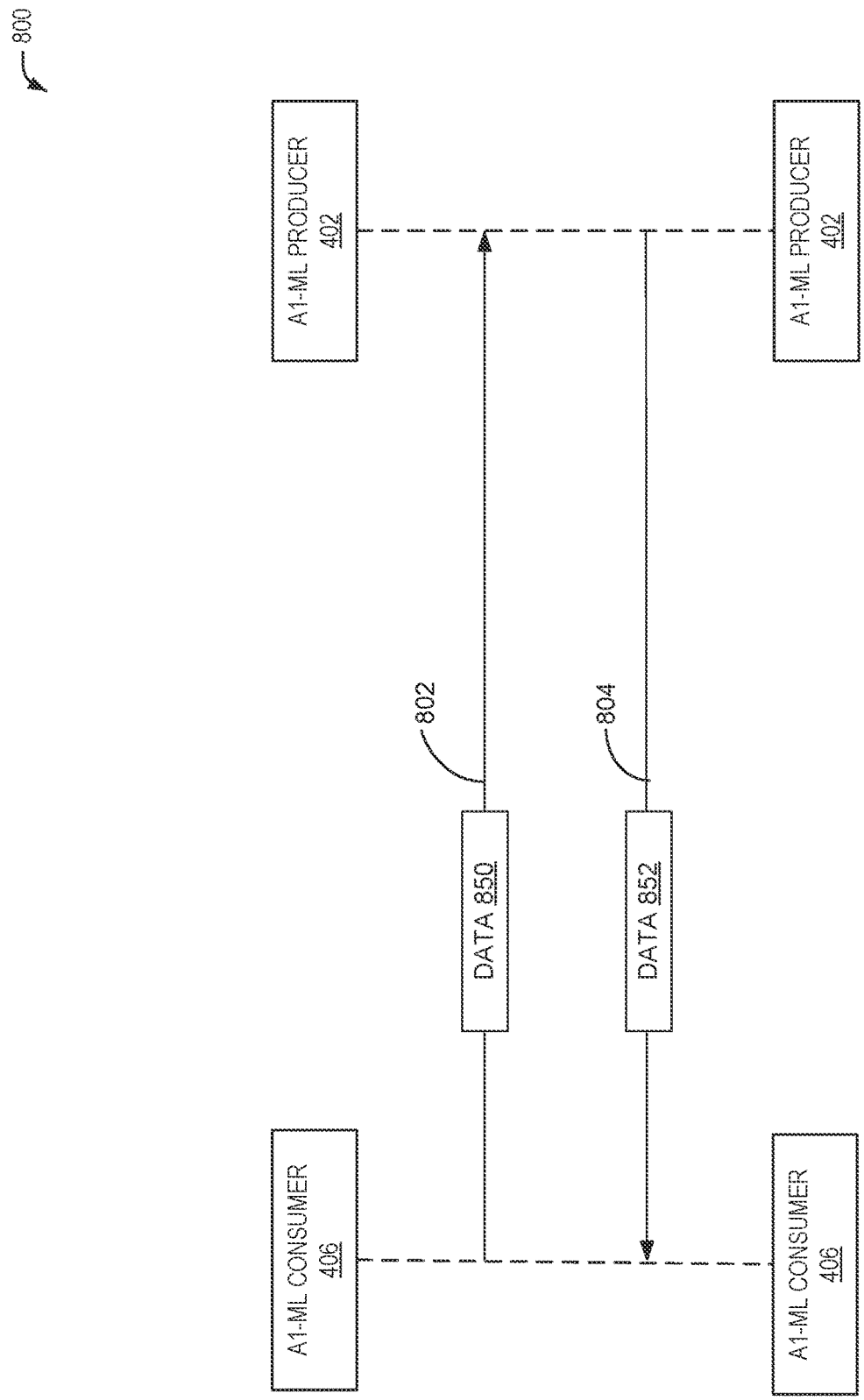
FIG. 8 illustrates a method for ML model registration, in accordance with some embodiments.

FIG. 8 illustrates a method 800 for ML model registration, in accordance with some embodiments. The method 800 allows the Near-RT RIC 214 to register a ML model 410 for ML model management in Non-RT RIC 212.

The method 800 begins at operation 802 with a put operation. The data 850 includes the put operation and any accompany data. The put operation may be "PUT ../models/{modelId}{ModelInstance}". For example, the A1-ML consumer 406 sends out an HTTP PUT request. The message body of the PUT request contains the model instance to be registered. The A1-ML consumer 406 indicates the supported model monitoring feedback types, and it may suggest heartbeat periodicity.

The method 800 continues at operation 804 with an indication that the ML model management is created. The data 852 includes the indication and any accompanying data. For example, on success of performing the requested operation 802, a code "201" is returned from the A1-ML producer 402, with the message body of the response containing the registered model instance. The A1-ML producer 402 configures the heartbeat timer for periodic model monitoring, and it configures monitoring feedback types based on the indicated reporting capability from A1-ML consumer 406. If the registration fails, e.g., if the A1-ML consumer 406 does not report its capability on monitoring, i.e., no "monitoringType", in operation 802, then an operation of failed may be sent by the A1-ML consumer 406.

Figure 9:
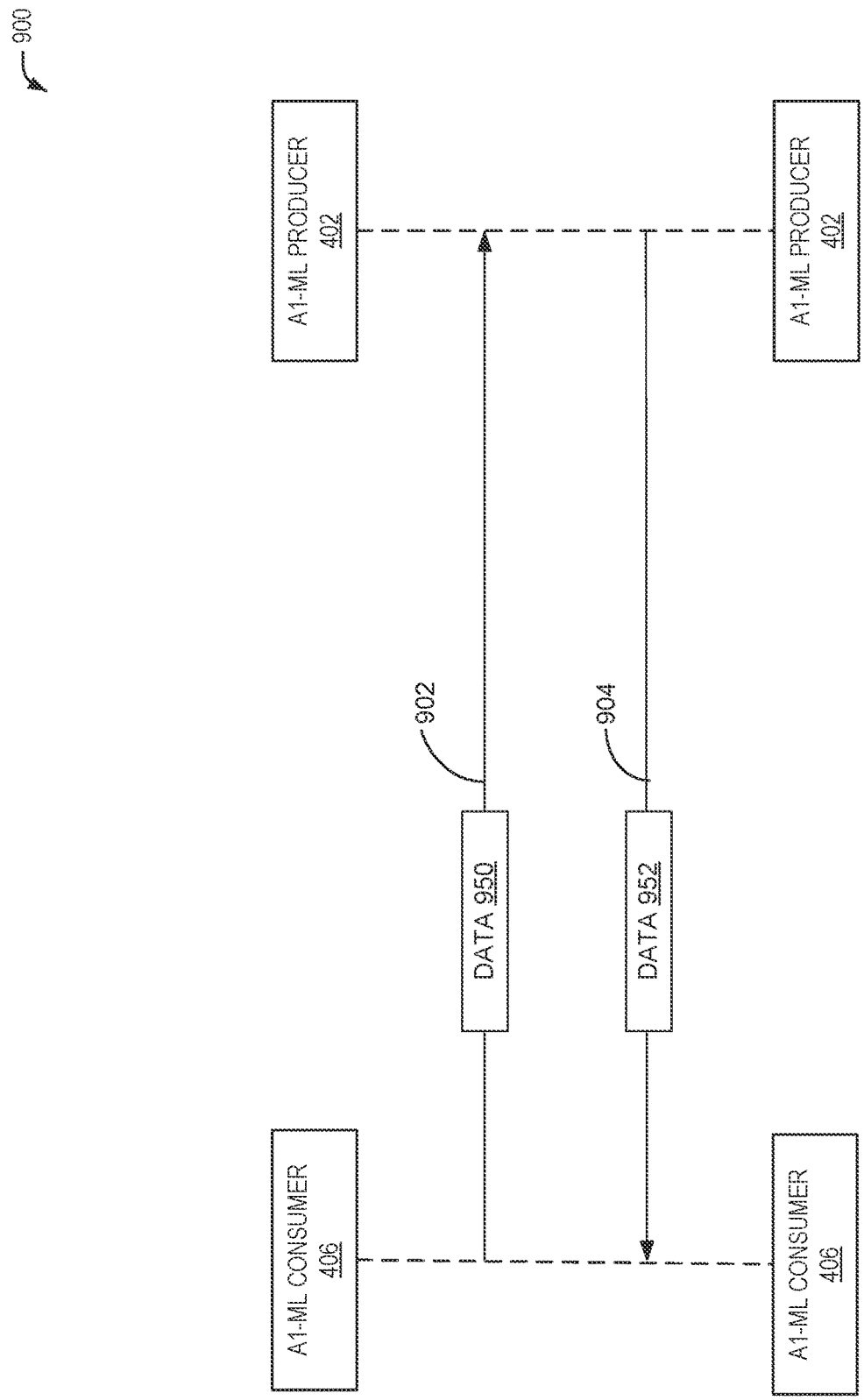
FIG. 9 illustrates a method for ML model updating (heartbeat), accordance with some embodiments.

FIG. 9 illustrates a method 900 for ML model updating (heartbeat), in accordance with some embodiments. This operation allows the Near-RT RIC 214 to update a registered ML model instance at the Non-RT RIC 212, e.g. ML model 408. The periodic update request also serves as heartbeat checks for registered models.

The method 900 begins at operation 902 with a put operation. The data 950 includes the put operation and any accompanying data. The put operation may be "PUT ../models/{modelID}{ModelInstance}". For example, the A1-ML consumer 406 sends out an HTTP PUT request. The message hod of the PUT request contains the model instance to be updated. The A1-ML consumer 406 may report the configured feedback to the A1-ML producer 403 for ML model monitoring.

The method 900 continues, on success, with operation 904 of sending an OK indication. The data 952 includes the OK indication and any accompanying data. For example, the OK indication may be "200 OK {ModelInstance}", which is returned from A1-ML producer 402, the message body of the response contains the updated ML model instance.

Figure 10:
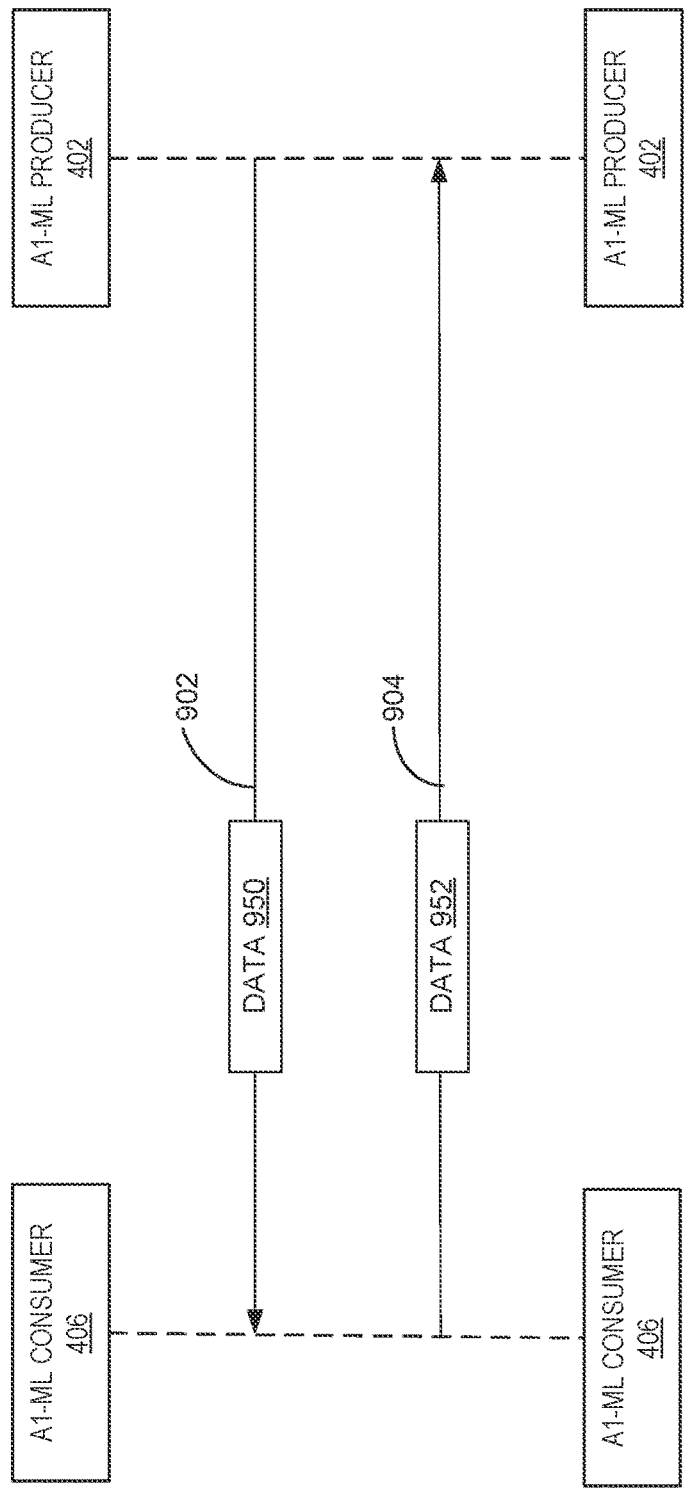
FIG. 10 illustrates a method of ML model management notification, in accordance with some embodiments.

FIG. 10 illustrates a method 1000 of ML model management notification, in accordance with some embodiments. This operation allows the Non-RT RIC 212 to send notifications to the Near-RT RIC 214.

The method 1000 begins at operation 902 with sending a post request. The data 950 includes the post request and any accompanying data. The A1-ML producer 402 sends out a HTTP POST request to the URI {notification Destination}, which is given as a callback URI during the registration of ML model instance. The request message body includes NotificationData.

The method 1000 continues, on success, at operation 904 with a response. The data 952 includes the response and any accompanying data. On success, the A1-ML consumer returns code "204" or "200", depending on the notification type.

Figure 11:
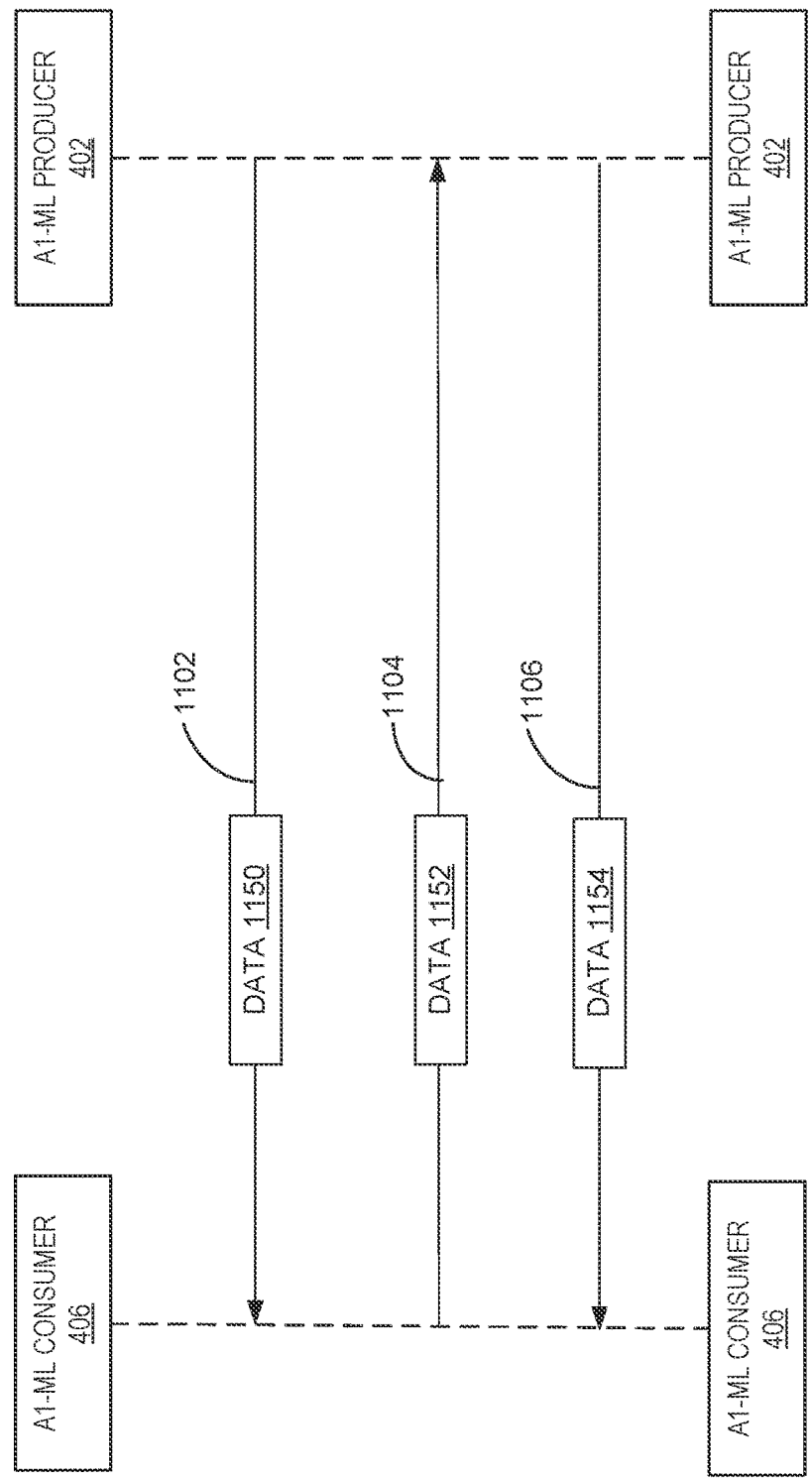
FIG. 11 illustrates a method for notification of a model file download, in accordance with some embodiments.

FIG. 11 illustrates a method for notification of a model file download, in accordance with some embodiments. If the notification is to trigger a model file download from the Non-RT RIC 212 to the Near-RT RIC 214, then the Notification Data includes the ML model file transfer information, including file type, location, size, and so forth. The ML model file is transferred using FTP, SFTP, or using another protocol.

The method 1100 begins at operation 1102 with a post notification. The data 1150 includes the post and any accompany data. An example post is "POST {notificationDestination}{NotficationData {notficationType='Model_DOWNLOAD'}}". The method 1100 continues at operation 1104 with an OK indication. The data 1152 includes the OK notification and any accompanying data. An example OK indication is "204 no content".

The method 1100 continues at operation 1106 with an ML model file transfer. The data 1154 includes the ML model file transfer. An example of the model file transfer is "<FTP or SFTP>model file transfer".

Figure 12:
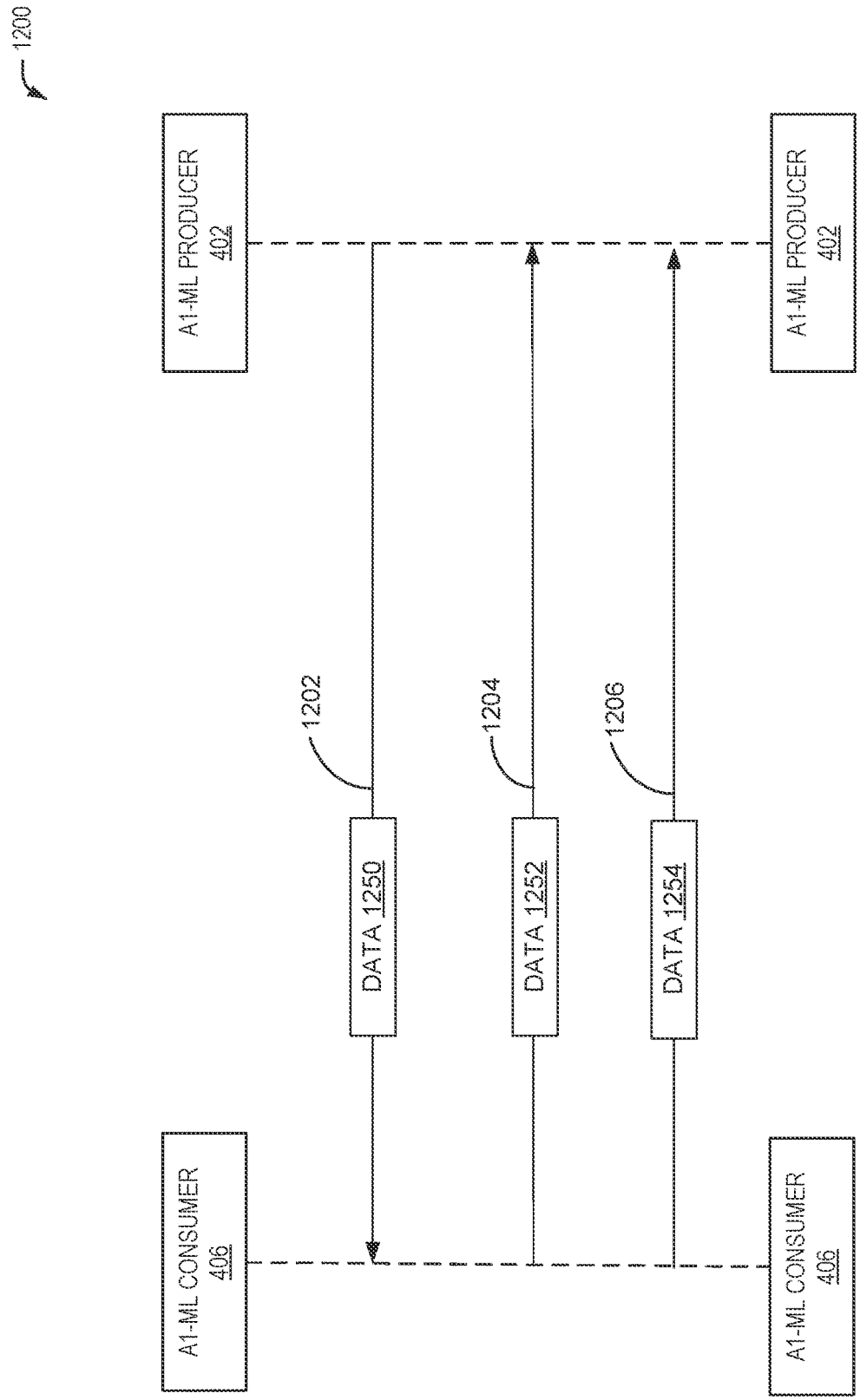
FIG. 12 illustrates a method for notification for model file upload, in accordance with some embodiments.

FIG. 12 illustrates a method 1200 for notification for model file upload, in accordance with some embodiments. If the notification is to trigger model file upload, then the A1-ML consumer 406 responds with an updated model instance carrying the model file transfer information. The ML model file is transferred using FTP, SFTP, or another protocol.

The method 1200 begins at operation 1202 with a post command. The data 1250 includes the post command and any accompanying data. An example post command is "POST {notificatonDestination} {NotificationData} {NotificationType='Model_Upload'}}".

The method 1200 continues at operation 1204 with an OK response. The data 1252 includes the OK response and any accompany data. An example of the OK response is "200 OK {ModelInstance}".

The method 1200 continues at operation 1206 with model transfer. The data 1254 includes the model transfer and any accompany data. An example of the model transfer is "<FTP or SFTP>model file transfer".

Figure 13:
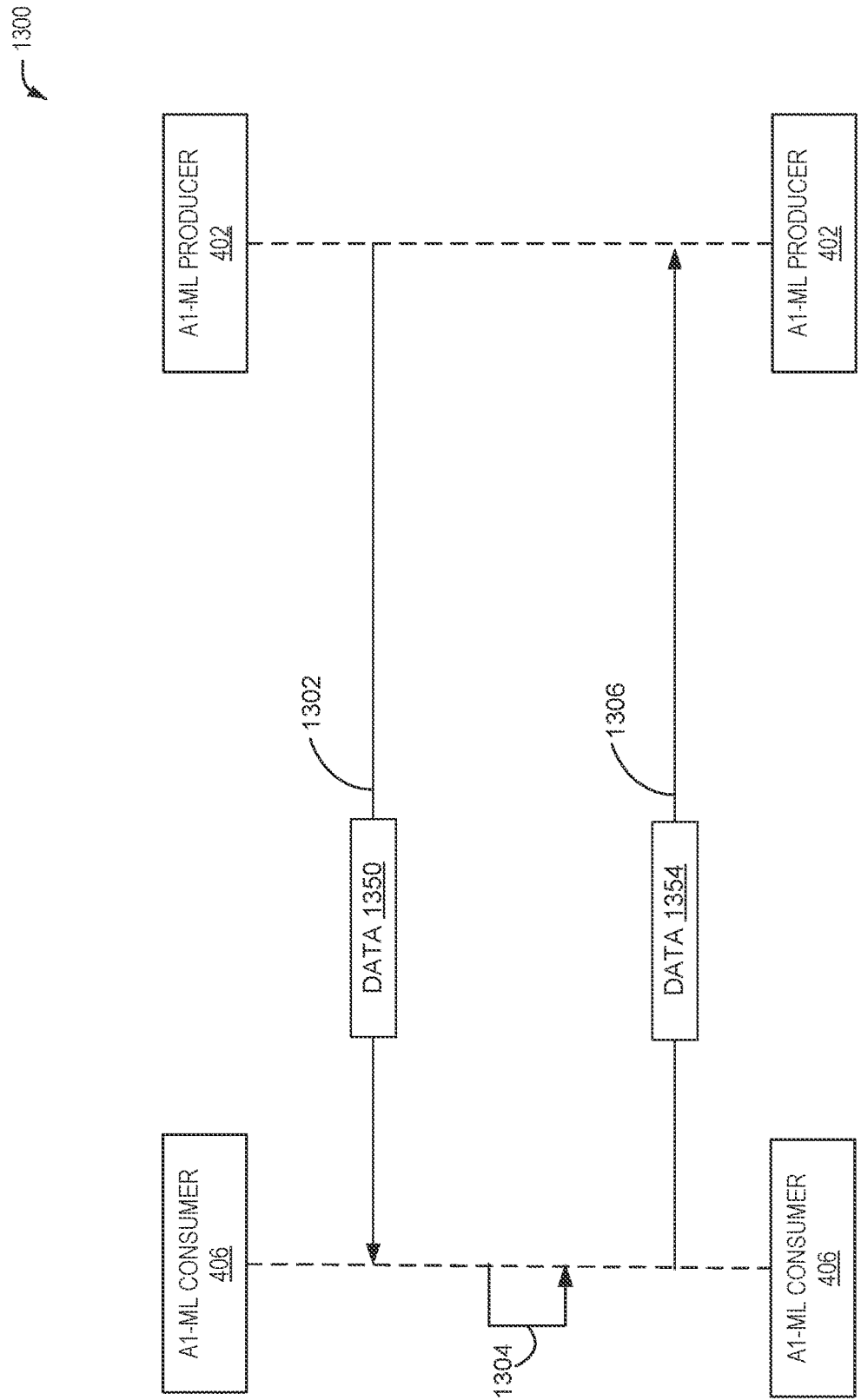
FIG. 13 illustrates a method for notification for model termination, in accordance with some embodiments.

FIG. 13 illustrates a method for notification for model termination, in accordance with some embodiments. If the notification is to trigger model termination, then Near-RT RIC 214 terminates the ML model being used.

The method 1300 begins at operation 1302 with a post command. The data 130 includes the post command and any accompanying data. An example post command is "POST {notificationDestination} {NotficationData {notificationType='Model_Termination'}}".

The method 1300 continues at operation 1304 with the A1-ML consumer 406 responding by termination the current ML model 410. The method 1300 continues at operation 1306 with an OK message. The data 1354 includes the OK message and any accompany data. An example of the OK message is "204 No Content."

Figure 14:
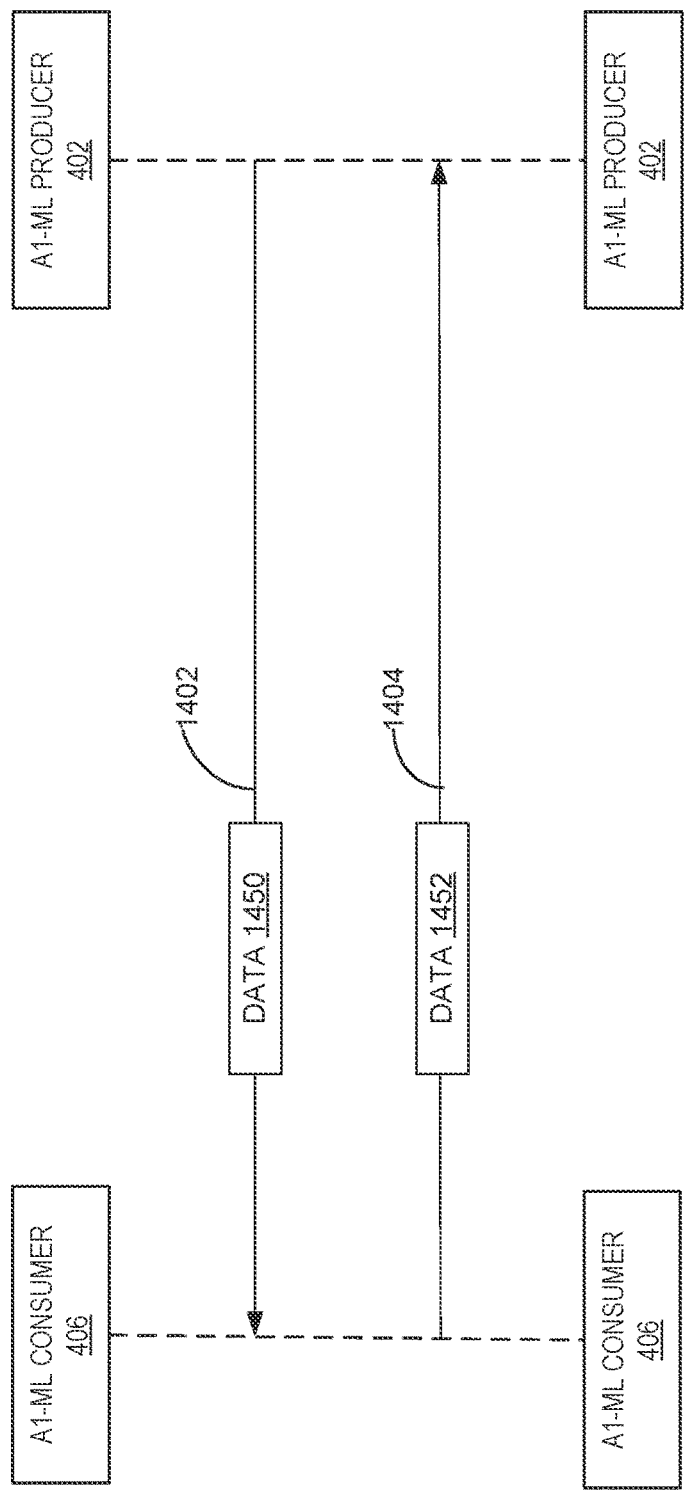
FIG. 14 illustrates a method for notification of model instance query, in accordance with some embodiments

FIG. 14 illustrates a method 1400 for notification of model instance query, in accordance with some embodiments. If the notification is to request a model instance query, then the A1-ML consumer 406 responds with ML model instance. If the A1-ML consumer 406 misses a heartbeat, then the A1-ML producer 402 may use the query notification to check the status of the model. The method 1400 begins at operation 1402 with a post command. The data 1450 includes the post command and any accompany data. An example of the post command is "POST {notificationDestination} {NotficationData {notficationType='Model_Query'}}".

The method 1400 continues at operation 1404 with an OK indication. The data 1452 includes the OK indication and any accompany data. An example of the OK indication is "200 OK {ModelInstance}", which includes an instance of the ML model.

Figure 15:
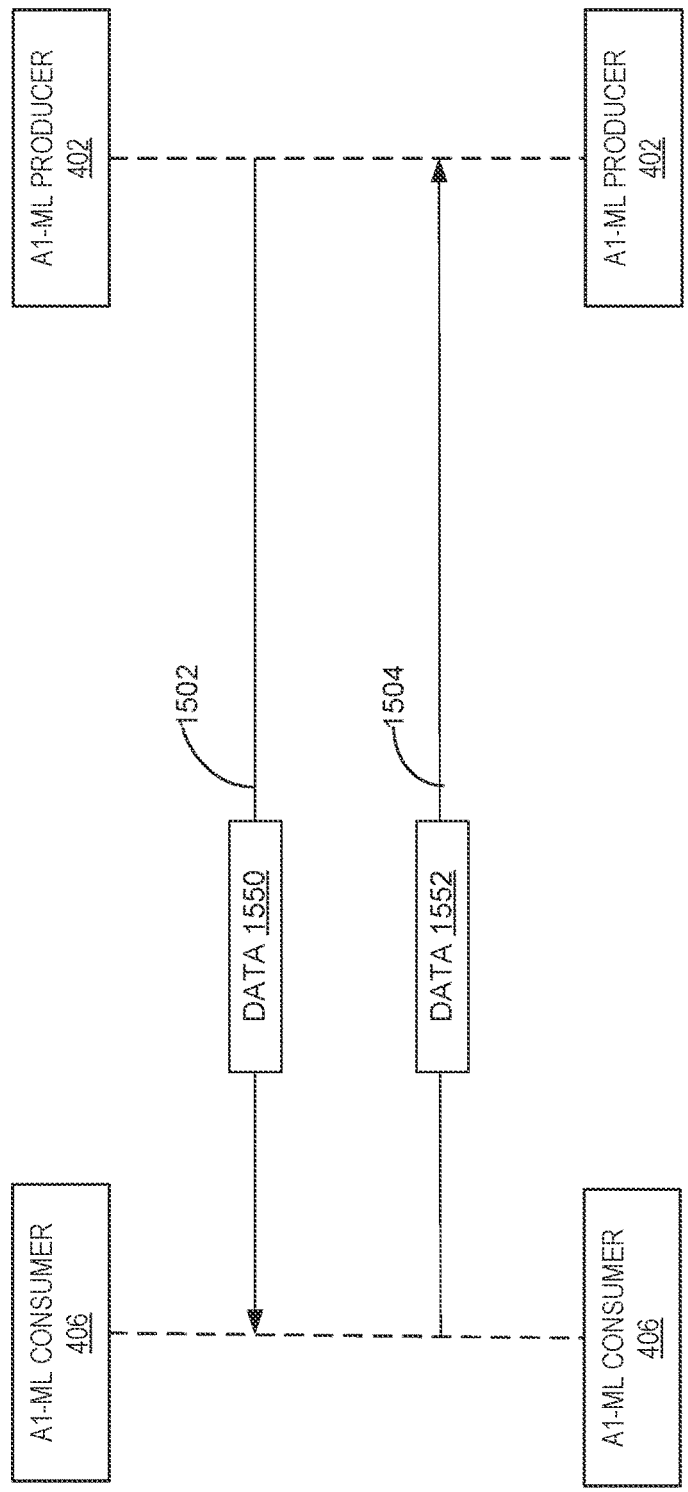
FIG. 15 illustrates a method for ML model instance retrieval, in accordance with some embodiments.

FIG. 15 illustrates a method 1500 for ML model instance retrieval, in accordance with some embodiments. This operation allows the Near-RT RIC 214 to retrieve a ML model 408 instance from Non-RT RIC 212.

The method 1500 begins at operation 1502 with a get request. The data 1550 includes the get request and any accompany data. An example get request is "GET ../models/{modelId}". For example, the A1-ML consumer 406 sends out a HTTP GET request. The request URI includes a modelId, and the message body is empty.

The method 1500, on success, continues at operation 1504 with are OK indication. The data 1552 includes the OK indication and any accompany data. An example of the OK indication is "200 OK {ModelInstance}". For example, on success, code "200" is returned from A1-ML producer 402 with the message body of the response including the ML model instance identified by the modelId.

Figure 16:
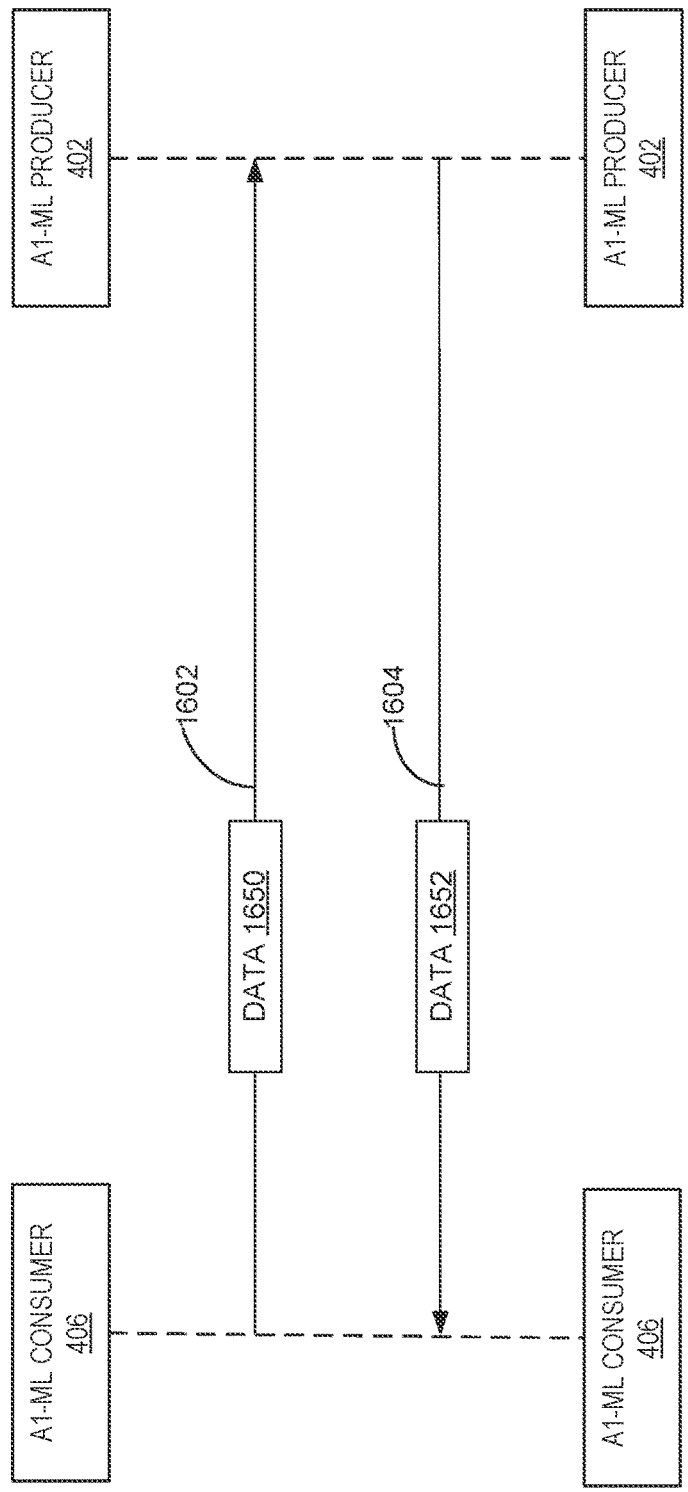
FIG. 16 illustrates a method for retrieving all registered ML model instances, in accordance with some embodiments.

FIG. 16 illustrates a method 1600 for retrieving all registered ML model instances, in accordance with some embodiments. The A1-ML consumer 406 may retrieve a list of ML model instances, and the A1-ML producer 402 returns an array of ModelIds corresponding to all ML model instances registered by the A1-ML consumer 406.

The method 1600 begins at operation 1602 with a get request. The data 1650 includes the get request and any accompany data. An example get request is "GET ../models". The method 1600 continues at operation 1604 with an OK indication. The data 1652 includes the OK indication and any accompany data. An example of the OK indication is "200 OK {array {ModelId}}".

Figure 17:
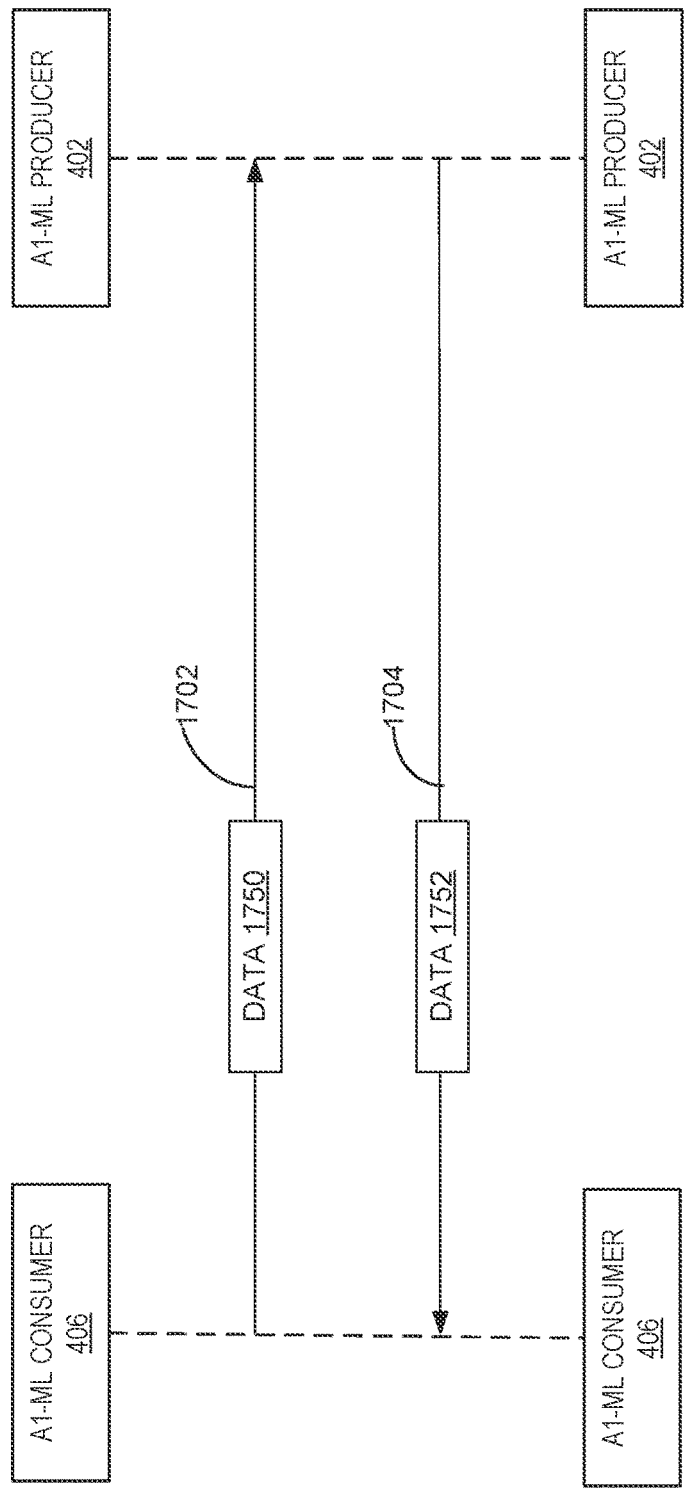
FIG. 17 illustrates a method for ML model deregistration, in accordance with sonic embodiments.

FIG. 17 illustrates a method 1700 for ML model deregistration, in accordance with some embodiments. This operation allows the Near-RT RIC 214 to deregister a ML model instance.

The method 1700 begins at operation 1702 with a delete request. The data 1750 includes the delete request and any accompany data. An example of the delete request is "DELETE ../models/{ }". For example, the A1-ML consumer 406 sends out a HTTP DELETE request with an empty message body.

The method 1700 continues, on success, at operation 1704 with sending an OK indication. The data 1752 includes the OK indication and any accompany data. An example of the success or OK indication is "204 No Content", which returned from the A1-ML producer 402, where the message body is also empty.

The methods described in conjunction with FIGS. 3-17 may include one or more additional operations. The operations of the methods described in conjunction with FIGS. 3-17 may be performed in a different order. One or more of the operations of the methods described in conjunction with FIGS. 3-17 may be optional. The names used for data types and entities described herein may be different and may be represented without spaces between the names or with underlines or hyphens between the names.

REFERENCES

[R01] O-RAN WG1, "O-RAN Architecture Description."

[R02] O-RAN WG2, "A1 interface: General Aspects and Principles."

[R03] O-RAN WG2, "A1 interface: Application Protocol."

[R04] O-RAN WG2, ""AI/MI, Workflow Description and Requirements".

[R04] 3GPP TS 36.401v15.1.0 (2019-01-09).

[R05] 3GPP TS 36.420 v15.2.0 (2020-01-09).

[R06] 3GPP TS 38.300 v16,0.0 (2020-01-08).

[R07] 3GPP TS 38.401 v16.0.0 (2020-01-09).

[R08] 3GPP TS 38.420 v15.2.0 (2019-01-08).

[R09] 3GPP TS 38.460 v16.0.0 (2020-01-09).

[R10] 3GPP TS 38.470 v16.0.0 (2020-01-09).

[R12] O-RAN Alliance Working Group 1, O-RAN Operations and Maintenance Architecture Specification, version 2.0 (December 2019) ("O-RAN-WG1.OAM-Architecture-v02.00").

[R13] O-RAN Alliance Working Group 1, O-RAN Operations and. Maintenance Interface Specification, version 2.0 (December 2019) ("O-RAN-WG1.O1-Interface-v02.00").

[R14] O-RAN Alliance Working Group 2, O-RAN A1 interface: General Aspects and Principles Specification, version 1.0 (October 2019) ("ORAN-WG2.A1.GA&P-v01.00").

[R15] O-RAN Alliance Working Group 3. Near-Real-time RAN Intelligent Controller Architecture & E2 General Aspects and Principles ("ORAN-WG3.E2GAP.0-v0.1").

[R16] O-RAN Alliance Working Group 4, O-RAN Fronthaul Management Plane Specification, version 2.0 (July 2019) ("ORAN-WG4.MP.0-v02.00.00").

[R17] O-RAN Alliance Working Group (WG) 4, O-RAN Fronthaul Control, User and Synchronization Plane Specification, version 2.0 (July 2019) ("ORAN-WG4.CUS.0-v02.00").

[R18] O-RAN WG1, "O-RAN Architecture Description".
[R20] O-RAN WG2, "Non-RT RIC Functional Architecture"

Terminology

The term "application" may refer to a complete and deployable package, environment to achieve a certain function in an operational environment. The term "AI/ML application" or the like may be an application that contains some AI/ML models and application-level descriptions.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The following are example embodiments. Example 1 is an A1 ML model management service (A1-ML) of a Non-RT RIC that provides model management for ML models deployed in the Near-RT RIC. The model management for the ML models deployed in Near-RT RIC is configured with the Non-RT RIC hosting the A1-ML producer and the Near-RT RIC hosting the A1-ML consumer.

In Example 2, the subject matter of Example 1, optionally, includes the A1-ML producer (of the Non-RT RIC) and A1-ML consumer (of the Near-RT RIC) both including an HTTP server and an HTTP client. The A1-ML service supports the following service operations: ML model instance registration; ML model instance update and heartbeat; Notification for ML model management, including model download, upload, and termination; ML mode instance retrieval; and ML model instance deregistration.

In Example 3, the subject matter of Examples 1 and 2 optionally include the A1-ML consumer registers a ML model instance using an HTTP PUT method. A ML model instance is identified by its modelId. When the A1-ML ML consumer requests ML model registration, it indicates the supported monitoring feedback types. The A1-ML consumer can indicate different supported monitoring feedback types for different registered ML model instances. When the A1-ML producer responds with the registration, it configures the monitoring based on the A1-ML consumer's indication. If the A1-ML consumer does not support a type of feedback, the A1-ML producer does not configure A1-ML consumer to report this type of feedback. When the A1-ML consumer requests a ML model registration, it can make a suggestion on the heartbeat periodicity. When the A1-ML producer responds with the registration, it configures the heartbeat periodicity.

In Example 4, the subject mailer of Examples 1-3 optionally include the A1-ML consumer updating a registered ML model using HTTP PUT method. In each update, the A1-ML consumer reports configured feedback for ML model monitoring. The periodic update from A1-ML consumer serves as heartbeat. The periodicity is configured by the A1-ML producer in the registration response message.

In Example 5, the subject matter of Examples 1-4, optionally, include the A1-ML producer, based on the analysis of monitoring results, sending notifications to the A1-ML consumer for ML model management. It uses HTTP POST method. A notification type is carried in notification data to state the purpose of the notification. The notification is used to trigger one of the following: an ML model download where the notification data contains model file transfer information; an ML model upload where the A1-ML consumer response message carries the updated model instance object with model file transfer information an ML model termination where the notification data optionally contains the reason of termination, and where the A1-ML consumer terminates the ML model after it receives the termination notification; or an ML mode query where the A1-ML producer can send notifications to query a model instance, for example, due to missing heartbeats where the A1-ML consumer response message carries the model instance object.

In Example 6, the subject matter of Examples 1-5, optionally, include the A1-ML consumer retrieving the ML model instances using HTTP GET method.

In Example 7, the subject matter of Examples 1-6, optionally, include the A1-ML, consumer deregistering a ML model instance using HTTP DELETE method.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a Non real-time (Non-RT) radio access network intelligence controller (RIC) (Non-RT RIC) in an open radio access network (O-RAN), the apparatus comprising: memory; and, processing circuitry coupled to the memory, the processing circuitry configured to:
receive, over an AI interface, a register machine learning (ML) model request from an AI-ML consumer of a Near-RT RIC, the register ML model request comprising a ML model instance to be registered with an AI-ML producer of the Non-RT RIC, the ML model instance comprising an indication of supported monitoring types; and
send a response, over the AI interface, to the AI-ML consumer, the response comprising a registered model instance, the registered model instance comprising an indication of monitoring types to be used and an indication of a periodicity of update messages to be sent by the AI-ML consumer, wherein the register ML model request comprises a hypertext transfer protocol (HTTP) put request and the response comprises an HTTP post.

2. The apparatus of claim 1 wherein the ML model instance and the registered model instance both comprise a same model identification (ID).

3. The apparatus of claim 1 wherein the processing circuitry is further configured to:
receive, over the AI interface, an update ML model request from the AI-ML consumer, the update ML model request comprising an updated ML model instance to replace the ML model instance, the updated ML model instance comprises a same model identification (ID) as the ML model instance; and
send a response, the response indicating a successful replacement of the ML mode instance with the updated ML model instance.

4. The apparatus of claim 3 wherein the updated ML mode comprises updates for the monitoring data.

5. The apparatus of claim 1 wherein the processing circuitry is further configured to:
receive, over the AI interface, an update message from the AI-ML consumer, the update message comprising monitoring data of the ML model instance being used by an ML inference module, wherein the monitoring data is based on the indication of monitoring types to be used.

6. The apparatus of claim 4 wherein the processing circuitry is further configured to:
process the monitoring data; and
determine based on the processing of the monitor data whether to request that the ML model be downloaded, request that the ML model be uploaded, request that the ML model be updated, request that the ML model be terminated, or to wait for a next update message.

7. The apparatus of claim 1 wherein the processing circuitry is further configured to:
post a ML model notification to a uniform resource identifier (URI) for notification of the AI-ML consumer, the ML model notification being a notification that the AI-ML producer is to download an update to the ML model instance, that the AI-ML consumer is to upload an updated ML model instance, or that the ML model instance is to be terminated.

8. The apparatus of claim 1 wherein the processing circuitry is further configured to:
send a ML model notification to the AI-ML consumer, the ML model notification being a notification that the AI-ML producer is to download an update to the ML model instance, that the AI-ML consumer is to upload an updated ML model instance, or that the ML model instance is to be terminated.

9. The apparatus of claim 8 wherein the ML notification comprises is the ML model instance is to be terminated, the ML notification further comprises a termination reason, and wherein the termination reason is that the ML model instance has too low of an accuracy, the ML model instance has too long of a processing delay, the ML model instance resource utilization is too high, a performance of the radio access network (RAN) is below a threshold performance, or another reason.

10. The apparatus of claim 1 wherein the processing circuitry is further configured to:
receive, over the AI interface, a retrieve message from the AI-ML consumer, the retrieve message comprising a model identification (ID); and
send another ML model instance have the model ID to the AI-ML consumer.

11. The apparatus of claim 1 wherein the processing circuitry is further configured to:
in response to a get command from the AI-Ml consumer, the get command comprising an indication of a directory and an indication of a ML model identification, transfer using hypertext transfer protocol (HTTP) another ML model having the model ID; and
send a code 200 to the AI-ML consumer when the transfer is complete.

12. The apparatus of claim 1 further comprising transceiver circuitry coupled to the memory; and antennas coupled to the transceiver circuitry.

13. A non-transitory computer-readable storage medium that stores instructions for execution by one or more processors of a non real-time (Non-RT) radio access network intelligence controller (RIC) (Non-RT RIC) in an Open RAN (O-RAN) network, the instructions to configure the one or more processors to perform the following operations:
receive, over an AI interface, a register machine learning (ML) model request from an AI-ML consumer of a Near-RT RIC, the register ML model request comprising a ML model instance to be registered with an AI-ML producer of the Non-RT RIC, the ML model instance comprising an indication of supported monitoring types; and
send a response, over the AI interface, to the AI-ML consumer, the response comprising a registered model instance, the registered model instance comprising an indication of monitoring types to be used and an indication of a periodicity of update messages to be sent by the AI-ML consumer, wherein the register ML model request comprises a hypertext transfer protocol (HTTP) put request and the response comprises an HTTP post.

14. The non-transitory computer-readable storage medium of claim 13 wherein the operations further comprise:
receive, over the AI interface, an update ML model request from the AI-ML consumer, the update ML model request comprising an updated ML model instance to replace the ML model instance, the updated ML model instance comprises a same model identification (ID) as the ML model instance; and send a response, the response indicating a successful replacement of the ML mode instance with the updated ML model instance.

15. An apparatus for a Near real-time (Non-RT) radio access network intelligence controller (RIC) (Non-Near-RT RIC) in an open radio access network (O-RAN), the apparatus comprising: memory; and, processing circuitry coupled to the memory, the processing circuitry configured to:

send, over an AI interface, a register machine learning (ML) model request to an AI-ML producer of a Non-RT RIC, the register ML model request comprising a ML model instance to be registered with the AI-ML producer, the ML model comprising an indication of supported monitoring types; and receive a response, over the AI interface, from the AI-ML producer, the response comprising a registered model instance, the registered model instance comprising an indication of monitoring types to be used and an indication of a periodicity of update messages to be sent by an AI-ML consumer of the Near-RT RIC, wherein the register ML model request comprises a hypertext transfer protocol (HTTP) put request and the response comprises an HTTP post, and wherein the ML model instance and the registered model instance both comprise a same model identification (ID).

16. The apparatus of claim 15 wherein the processing circuitry is further configured to:

send, over the AI interface, an update ML model request from the AI-ML consumer, the update ML model request comprising an updated ML model instance to replace the ML model instance, the updated ML model instance comprising a same model identification (ID) as the ML model instance; and receive a response, the response indicating a successful replacement of the ML mode instance with the updated ML model instance.

17. The apparatus of claim 15 wherein the processing circuitry is further configured to:

send, over the AI interface, an update message to the AI-ML producer, the update message comprising monitoring data of the ML model instance being used by an ML inference module, wherein the monitoring data is based on the indication of monitoring types to be used.

* * * * *